United States Patent
Kang

(10) Patent No.: US 10,594,797 B2
(45) Date of Patent: Mar. 17, 2020

(54) METHOD AND APPARATUS FOR CONTROLLING PERIPHERAL DEVICE

(71) Applicant: SAMSUNG ELECTRONICS CO., LTD., Suwon-si (KR)

(72) Inventor: Hyeonjin Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 15/572,093

(22) PCT Filed: Apr. 28, 2016

(86) PCT No.: PCT/KR2016/004444
§ 371 (c)(1),
(2) Date: Nov. 6, 2017

(87) PCT Pub. No.: WO2016/190557
PCT Pub. Date: Dec. 1, 2016

(65) Prior Publication Data
US 2018/0146045 A1 May 24, 2018

(30) Foreign Application Priority Data
May 27, 2015 (KR) .......... 10-2015-0073993

(51) Int. Cl.
*G06F 15/16* (2006.01)
*H04L 29/08* (2006.01)
(Continued)

(52) U.S. Cl.
CPC .......... *H04L 67/125* (2013.01); *G10L 15/22* (2013.01); *H04Q 9/00* (2013.01); *H04W 4/12* (2013.01);
(Continued)

(58) Field of Classification Search
USPC .......... 709/203, 220, 222, 223, 224
See application file for complete search history.

(56) References Cited

U.S. PATENT DOCUMENTS

| 9,626,133 B2 * | 4/2017 | Hasama | H04N 1/00413 |
| 2004/0158620 A1 * | 8/2004 | Ha | G05B 15/02 |
| | | | 709/219 |

(Continued)

FOREIGN PATENT DOCUMENTS

| JP | 2000-152352 A | 5/2000 |
| JP | 2009-246543 A | 10/2009 |

(Continued)

OTHER PUBLICATIONS

International Search Report, issued by International Searching Authority in corresponding International Application No. PCT/KR2016/004444, dated Jul. 29, 2016, (PCT/ISA/210).

(Continued)

*Primary Examiner* — Lan Dai T Truong
(74) *Attorney, Agent, or Firm* — Sughrue Mion, PLLC

(57) ABSTRACT

Provided is a technology for sensor networks, machine to machine (M2M) communication, machine type communication (MTC), and the Internet of Things (IoT). The present disclosure can be utilized for intelligent services based on the above technology (smart home, smart building, smart city, smart or connected car, healthcare, digital education, retail business, security and safety related services).
There is provided a system for controlling peripheral devices. The system may include: an electronic device to transmit ID information; at least one peripheral device to receive the ID information; and a server to perform receiving the ID information and state information of the peripheral device from the peripheral device, and transmitting the electronic device a user interface corresponding to the peripheral device on the basis of the ID information and state (Continued)

information, wherein the electronic device may receive user input while the user interface is being presented and transmit the server data for controlling the peripheral device in response to the user input, and the server may control the peripheral device based on the received data.

17 Claims, 21 Drawing Sheets

(51) Int. Cl.

| | | |
|---|---|---|
| *H04Q 9/00* | (2006.01) | |
| *H04W 80/12* | (2009.01) | |
| *H04W 8/24* | (2009.01) | |
| *H04W 88/06* | (2009.01) | |
| *H04W 4/70* | (2018.01) | |
| *G10L 15/22* | (2006.01) | |
| *H04W 4/12* | (2009.01) | |
| *H04W 4/80* | (2018.01) | |
| *H04W 8/00* | (2009.01) | |
| *H04W 88/04* | (2009.01) | |

(52) U.S. Cl.
CPC ............... *H04W 4/70* (2018.02); *H04W 8/24* (2013.01); *H04W 80/12* (2013.01); *H04W 88/06* (2013.01); *H04Q 2209/25* (2013.01); *H04Q 2209/43* (2013.01); *H04W 4/80* (2018.02); *H04W 8/005* (2013.01); *H04W 88/04* (2013.01); *Y04S 40/18* (2018.05)

(56) References Cited

U.S. PATENT DOCUMENTS

| | | | |
|---|---|---|---|
| 2014/0195252 A1 | 7/2014 | Gruber et al. | |
| 2015/0009020 A1 | 1/2015 | Shekhar et al. | |
| 2015/0056920 A1* | 2/2015 | Huttunen | H04B 7/26 455/41.2 |
| 2015/0067080 A1 | 3/2015 | Cho et al. | |
| 2016/0128124 A1* | 5/2016 | Liu | H04W 76/14 709/204 |

FOREIGN PATENT DOCUMENTS

| | | |
|---|---|---|
| KR | 10-2013-0077734 A | 7/2013 |
| KR | 10-2015-0005061 A | 1/2015 |
| KR | 10-2015-0028008 A | 3/2015 |

OTHER PUBLICATIONS

Written Opinion, issued by International Searching Authority in corresponding International Application No. PCT/KR2016/004444, dated Jul. 29, 2016, (PCT/ISA/237).

* cited by examiner

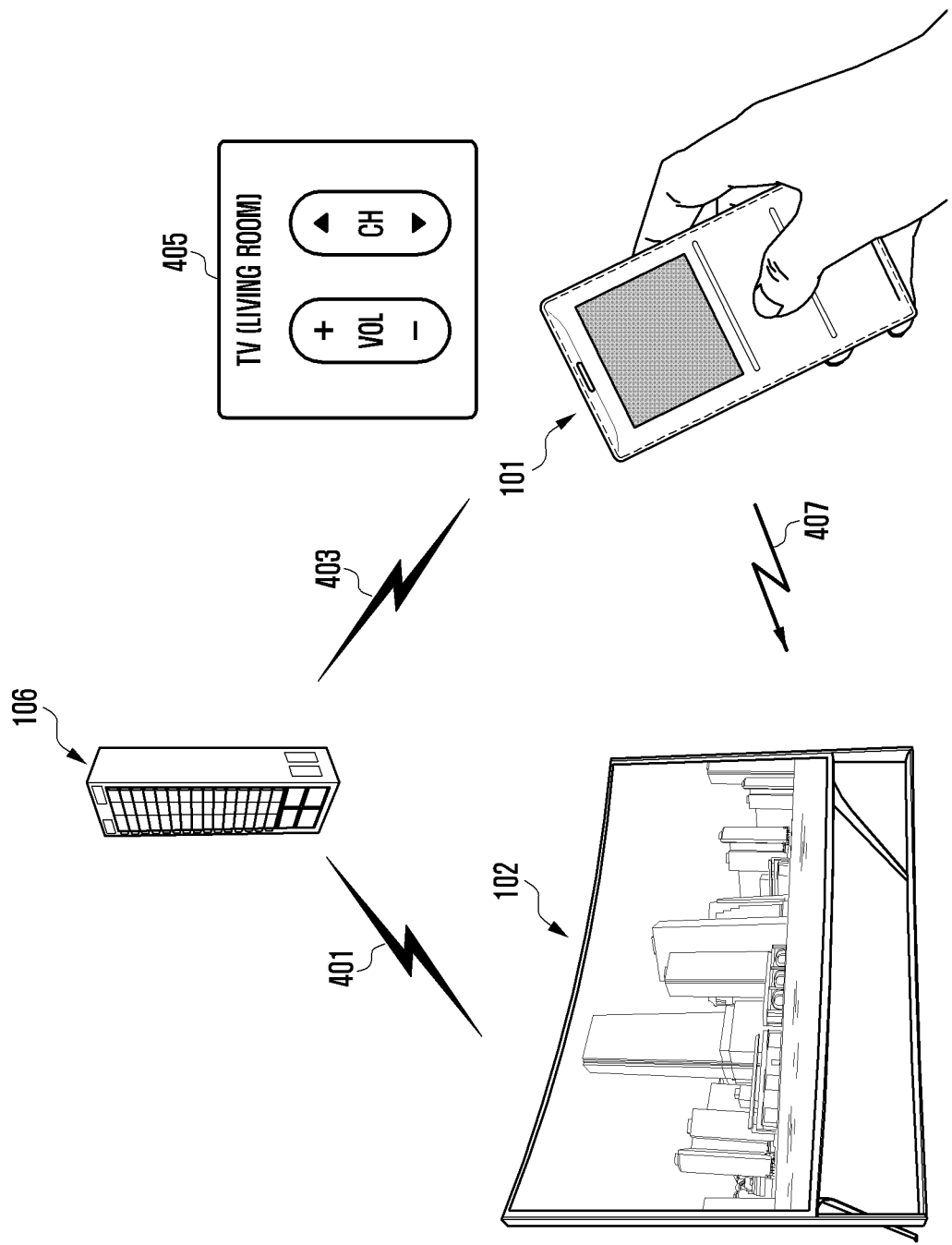

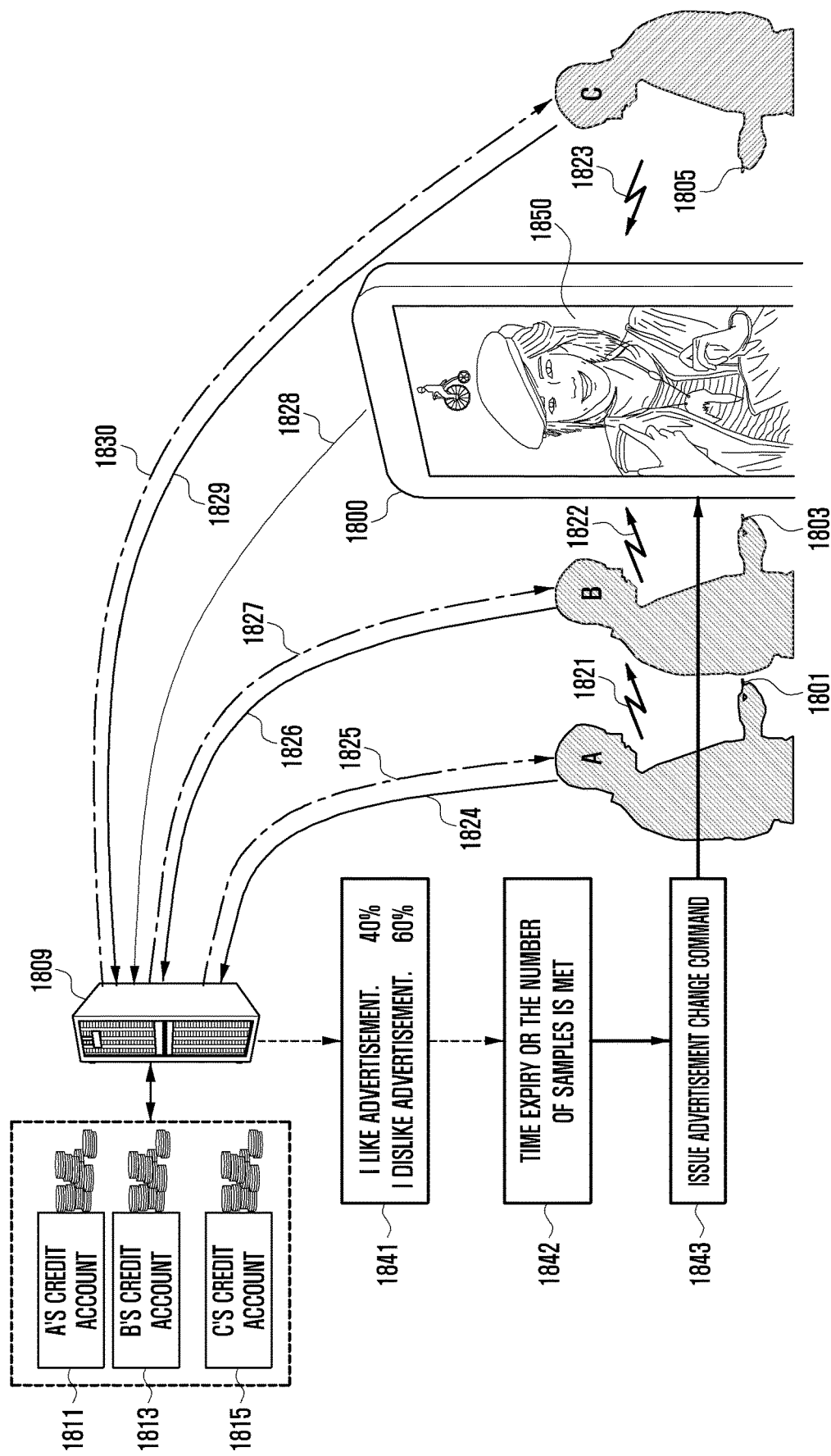

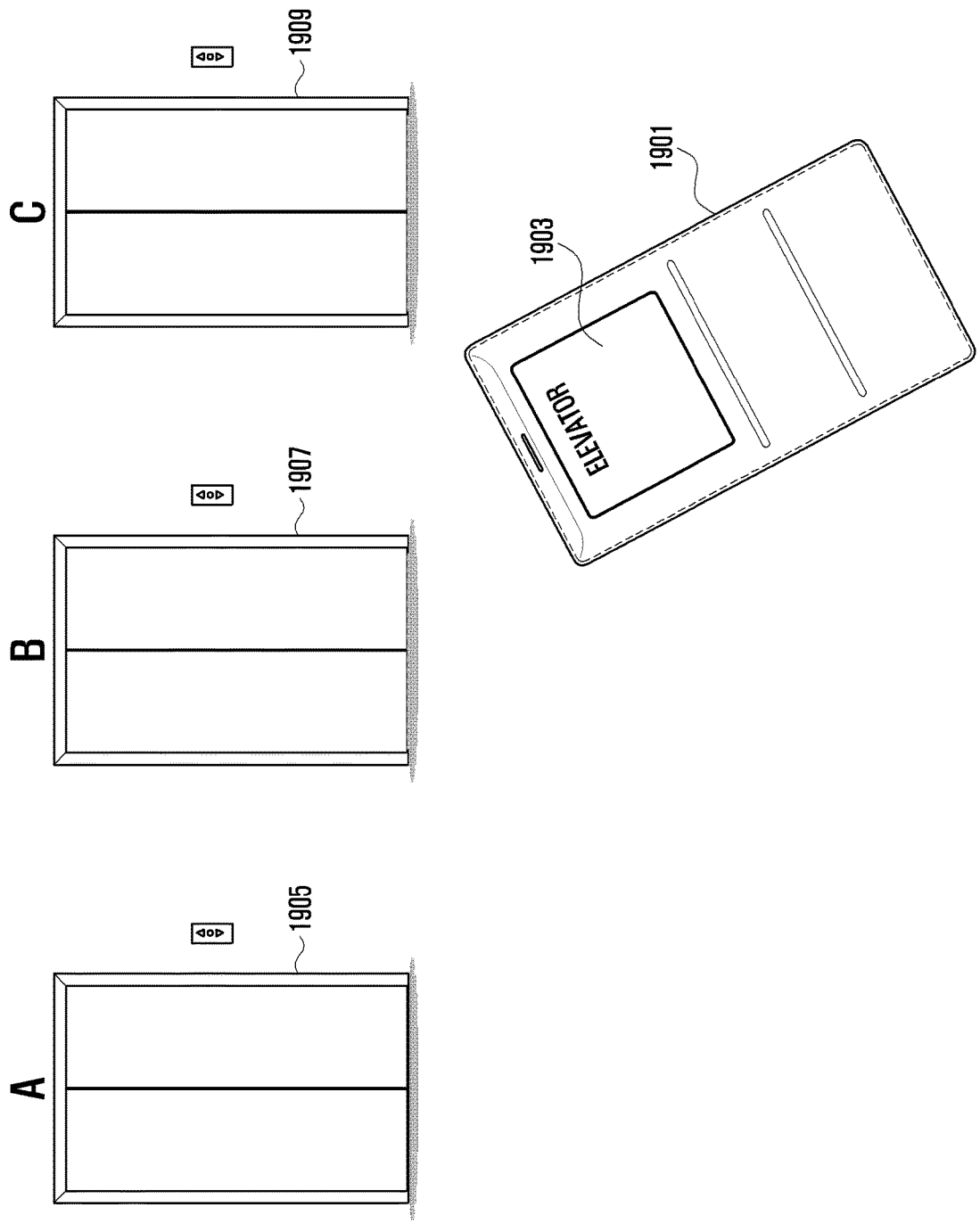

METHOD AND APPARATUS FOR CONTROLLING PERIPHERAL DEVICE

TECHNICAL FIELD

The present invention relates to a method and apparatus for controlling peripheral devices in a wireless communication system and, more particularly, to a peripheral device control method and apparatus wherein, when a user terminal transmits information related to the user terminal to a peripheral device and the peripheral device forwards the information related to the user terminal to a server, the server transmits data necessary for controlling the peripheral device to the user terminal.

BACKGROUND ART

The Internet is evolving from a human centered network where humans create and consume information into the Internet of Things (IoT) where distributed elements or things process and exchange information. Big data processing through cloud servers and IoT technology are being combined into the Internet of Everything (IoE). To realize IoT services, base technologies such as sensing, wired/wireless communication and network infrastructure, service interfacing and security are needed, and technologies interconnecting things such as sensor networks, machine-to-machine (M2M) and machine type communication (MTC) are under development.

In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

The Internet of Things (IoT) is a term describing a paradigm where all things have network connectivity and can share their information or operate using different information through the network connectivity.

As noted above, an IoT device has connectivity, but it may not include an input unit such as a keyboard or an output unit such as a display. Hence, to control the IoT device or check information contained therein after connecting to the IoT device, it may be required first to install a host application for the IoT device in a smartphone or personal computer (PC).

Typical IoT devices do not use a general-purpose host application but use dedicated host applications. Hence, it may be necessary to install different host applications in the user terminal for individual IoT devices. For example, to check or adjust the current brightness and remaining lifetime of a smart light without a separate display or speaker, the user may have to connect a smartphone or PC to the smart light first and then execute a corresponding host application to check the information that the smart light has.

Even in the case of a TV with separate input and output units, to control the TV through a user terminal, a separate application must be installed in the user terminal.

DISCLOSURE OF INVENTION

Technical Problem

To check information of an IoT device or to control or adjust the IoT device, it is necessary to install a dedicated application in a terminal such as a smartphone or PC and connect to the IoT device in a direct or indirect manner. In addition, although IoT devices are widely used and various information can be obtained or manipulated from the IoT devices, the IoT devices often do not have separate input/output interfaces. Hence, it is difficult to utilize the IoT devices unless the corresponding applications are downloaded and installed in the user terminal and the user terminal is connected to the IoT devices through those applications. It is also difficult to identify what available services and controllable IoT devices are in the vicinity.

In the present invention, after initial service registration between the user terminal and IoT devices, without any additional user manipulation such as directly establishing network connections between the user terminal and the IoT devices or installing corresponding applications, a user interface is automatically provided that is necessary for acquiring information about the IoT devices or controlling the IoT devices. Consequently, the user can readily identify available IoT devices in the vicinity and control the IoT devices in a rapid and convenient manner through the user terminal.

Solution to Problem

In accordance with an aspect of the present invention, there is provided an electronic device. The electronic device may include: an input unit to receive user input; an output unit to provide information; a first communication unit to communicate using a first communication scheme; a second communication unit to communicate using a second communication scheme; and a controller to perform transmitting ID information of the electronic device to a peripheral device through the first communication unit, receiving a user interface for controlling the peripheral device from a server through the second communication unit, outputting the user interface through the output unit, and transmitting control data for the peripheral device in response to the user input received through the input unit to the server through the second communication unit. The output unit may provide the user interface in a visual form. The output unit may provide the user interface in an audible form. The second communication scheme may support relatively long distance communication compared with the first communication scheme.

The user interface and the control data for the peripheral device may include web-based information.

In accordance with another aspect of the present invention, there is provided a system for controlling peripheral devices. The system may include: an electronic device to transmit ID information; at least one peripheral device to receive the ID information; and a server to perform receiving the ID information and state information of the peripheral device from the peripheral device, and transmitting the electronic device a user interface corresponding to the peripheral device on the basis of the ID information and state information, wherein the electronic device may receive user input while the user interface is being presented and transmit the server data for controlling the peripheral device in response to the user input, and the server may control the peripheral device based on the received data.

The electronic device may communicate with the peripheral device through a first communication scheme, and the server may communicate with the electronic device and the peripheral device through a second communication scheme. The user interface and the data for controlling the peripheral device may include web-based information. The server may transmit the state information of the peripheral device to the electronic device.

The state information may include information on the received signal strength of a signal transmitted by the electronic device, and the server may determine whether to control the peripheral device based on the received signal strength.

In accordance with another aspect of the present invention, there is provided a method for an electronic device to control peripheral devices. The method may include: transmitting ID information of the electronic device to a peripheral device through a first communication unit; receiving a user interface for controlling the peripheral device from a server through a second communication unit; outputting the user interface; receiving user input; and transmitting control data for the peripheral device in response to the user input to the server through the second communication unit.

The user interface may be provided in a visual form. The user interface may also be provided in an audible form.

In accordance with another aspect of the present invention, there is provided a method for controlling peripheral devices. The method may include: transmitting, by an electronic device, ID information; receiving, by a peripheral device, the ID information; receiving, by a server, the ID information and state information of the peripheral device from the peripheral device; transmitting, by the server, a user interface corresponding to the peripheral device to the electronic device on the basis of the ID information and state information; receiving, by the electronic device, the user interface; providing, by the electronic device, the user interface; receiving, by the electronic device, user input; transmitting, in response to the user input, data for controlling the peripheral device to the server; and controlling, by the server, the peripheral device based on the received data. The electronic device may communicate with the peripheral device through a first communication scheme, and the server may communicate with the electronic device and the peripheral device through a second communication scheme. The user interface and the data for controlling the peripheral device may include web-based information. The method may further include transmitting, by the server, the state information of the peripheral device to the electronic device. The state information may include information on the received signal strength of a signal transmitted by the electronic device. The method may further include determining, by the server, whether to control the peripheral device based on the received signal strength.

Advantageous Effects of Invention

In a feature of the present invention, it is possible to provide an electronic device and operation method therefor that discover peripheral devices without separate user manipulation, receive a user interface for controlling peripheral devices, and control the peripheral devices. It is also possible to provide a peripheral device that interworks with the electronic device, and an operation method therefor. It is also possible to provide a server that interworks with the electronic device, and an operation method therefor. In addition, it is possible to provide a control system including the electronic device, the peripheral device, and the server.

According to an embodiment of the present invention, a peripheral device control system may include: an electronic device to transmit ID information; at least one peripheral device to receive the ID information; and a server that receives the ID information and state information from the peripheral device and sends the electronic device a user interface matching the peripheral device on the basis of the ID and state information of the peripheral device, and wherein the electronic device having the user interface may receive user input and send data for controlling the peripheral device in response to the user input and the server may control the peripheral device based on the received data. Hence, it is possible to control peripheral devices in a rapid and convenient way.

BRIEF DESCRIPTION OF DRAWINGS

FIG. 4A illustrates an embodiment for controlling a peripheral device using the electronic device according to an embodiment of the present invention.

FIG. 18 illustrates a process whereby multiple electronic devices control a peripheral device according to another embodiment of the present invention.

FIG. 19 illustrates a process whereby the electronic device controls multiple peripheral devices according to another embodiment of the present invention.

MODE FOR THE INVENTION

Figure 1:
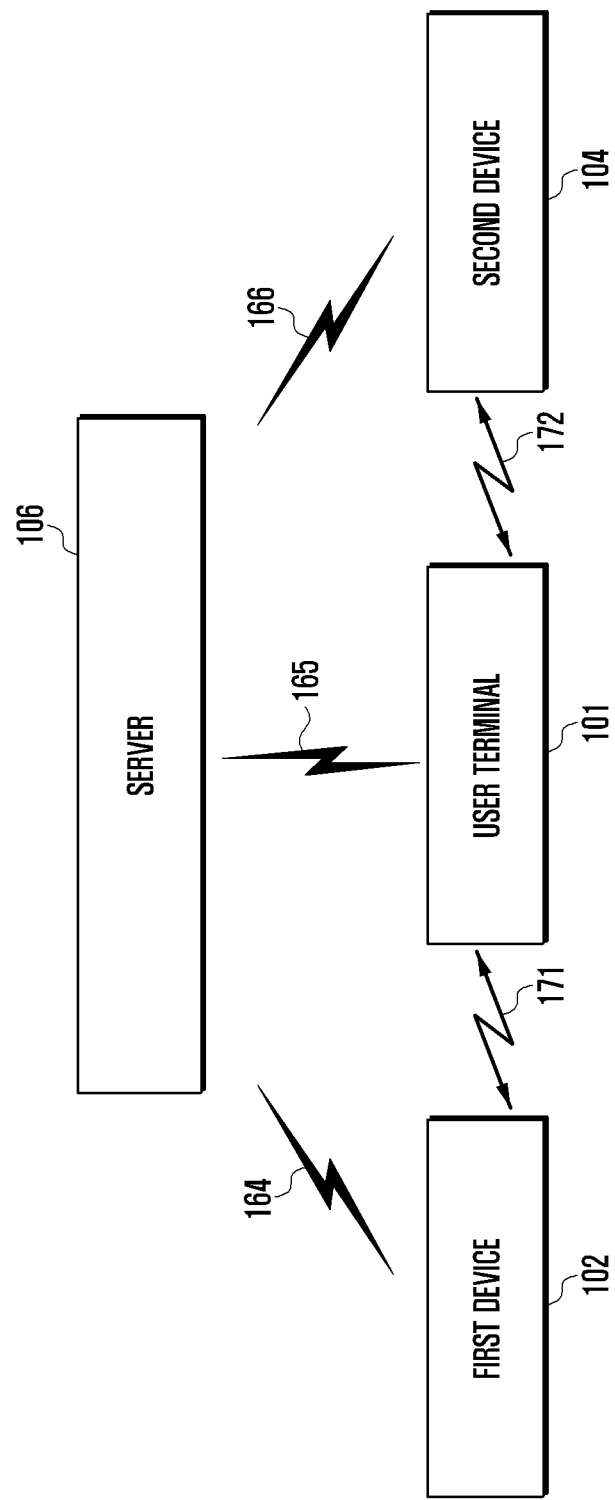
FIG. 1 illustrates the configuration of a peripheral device control system according to an embodiment of the present invention.

Hereinafter, various embodiments of the present invention are described in detail with reference to the accompanying drawings. However, it should be appreciated that the present disclosure is not limited to a specific embodiment and all modifications, equivalents and/or alternatives thereof also belong to the scope of the present invention. The same or similar reference symbols are used throughout the drawings to refer to the same or like parts.

In the description, an expression "have", "may have", "include" or "may include" indicates the existence of a specific feature (e.g. number, function, operation, or component like a part) and does not exclude the existence of other features.

In the description, the expression "A or B", "at least one of A and/or B", or "one or more of A and/or B" may indicate all possible combinations of A and B. For example, "A or B", "at least one of A and B", "at least one of A or B" may indicate any of (1) including at least A, (2) including at least B, or (3) including at least A and at least B.

In various embodiments, the terms "first" and "second" may modify various elements regardless of importance and/or order and are used to distinguish one element from another element without limitation. For example, a first user device and a second user device may indicate different user devices regardless of the order or importance of the devices. As another example, a first component may be denoted as a second component, and vice versa without departing from the scope of the present disclosure.

It will be understood that when an element (e.g. first element) is referred to as being (operatively or communicatively) "coupled with/to" or "connected with/to" another element (e.g. second element), it can be coupled or connected with/to the other element directly or via a third element. In contrast, it will be understood that when an element (e.g. first element) is referred to as being "directly coupled with/to" or "directly connected with/to" another element (e.g. second element), no other element (e.g. third element) intervenes between the element and the other element.

In the description, the phrase "configured (or set) to" may be used interchangeably with the phrase "suitable for", "having the capacity to", "designed to", "adapted to", "made to" or "capable of" depending on circumstances. The term "configured (or set) to" does not essentially mean "specifically designed in hardware to." Rather, the phrase "configured to" may mean that a device can perform a specific operation together with other devices or parts. For example, the phrase "processor configured (or set) to perform A, B, and C" may mean a dedicated processor (e.g. embedded processor) for performing the operations or a general-purpose processor (e.g. central processing unit (CPU) or application processor) that may perform the operations by executing one or more software programs stored in a memory unit.

In the description, the "content" may include a moving image, a still image, text, a graphic object, and a web page. The content may also include a piece of content or multiple pieces of content.

The "peripheral device" may refer to an electronic device having a communication function or a legacy device with an attached patch having a communication function, located in the vicinity of a user terminal. For example, such a peripheral device may be an IoT device.

The "location information" may indicate the path or address information of a location where data is stored. The location information may specify a storage space within a server or electronic device. The location information may be, for example, a URL link.

Some terms used herein may be provided merely to describe a specific embodiment without limiting the scope of another embodiment. In the description, the singular forms "a", "an" and "the" are intended to include the plural forms as well, unless the context clearly indicates otherwise. The terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In any case, the terms defined herein should not be interpreted to exclude certain embodiments of the present disclosure.

Next, the present invention is described in detail with reference to the accompanying drawings.

FIG. 1 illustrates the configuration of a peripheral device control system according to an embodiment of the present invention. In FIG. 1, a user terminal 101, a first device 102, a second device 104, and a server 106 are shown.

The user terminal 101 may be an electronic device such as a smartphone, a tablet PC, or a mobile phone. The user terminal 101 may also be an electronic device supporting wireless communication.

Each of the first device 102 and the second device 104 may be a peripheral device, such as an electronic device or an IoT device, in the vicinity of the user terminal 101. In the following description, the user terminal 101 may be referred to as an electronic device, and the first device 102 and the second device 104 may be referred to as a peripheral device. The IoT device may refer to an electronic device that has network connectivity on its own or with the aid of an attached patch. For example, a home electronic appliance such as a TV, refrigerator, washing machine, smart light, vacuum cleaner, microwave oven, camera, audio system and smart door lock, and a large flat display (LFD) located at a public place may be an IoT device.

The server 106 may be a computer system at a remote location and may establish a network with the electronic device 101 and the peripheral devices 102 and 104 through a communication unit. The server 106 may include a computation unit to perform a service, a storage unit to store computation results and information on various electronic devices forming a network, and a communication unit to perform communication. The server 106 may be replaced by a computer system at home.

The electronic device 101 and the peripheral devices 102 and 104 may communicate with the server 106 through a second communication scheme (164, 165, 166). The second communication scheme may be long distance communication based on, for example, Long-Term Evolution (LTE), LTE advance (LTE-A), code division multiple access (CDMA), wideband CDMA (WCDMA), Universal Mobile Telecommunications System (UMTS), Wireless Broadband (WiBro), or Global System For Mobile Communications (GSM).

The electronic device 101 and the peripheral devices 102 and 104 may communicate through a first communication scheme (171, 172). The first communication scheme may be short-range communication based on, for example, Near Field Communication (NFC), Wi-Fi, infrared, ultrasound, Bluetooth Low Energy (BLE), or Visual Light Communication (VLC), which encodes information in a flicker that can be detected at close range.

Figure 2:
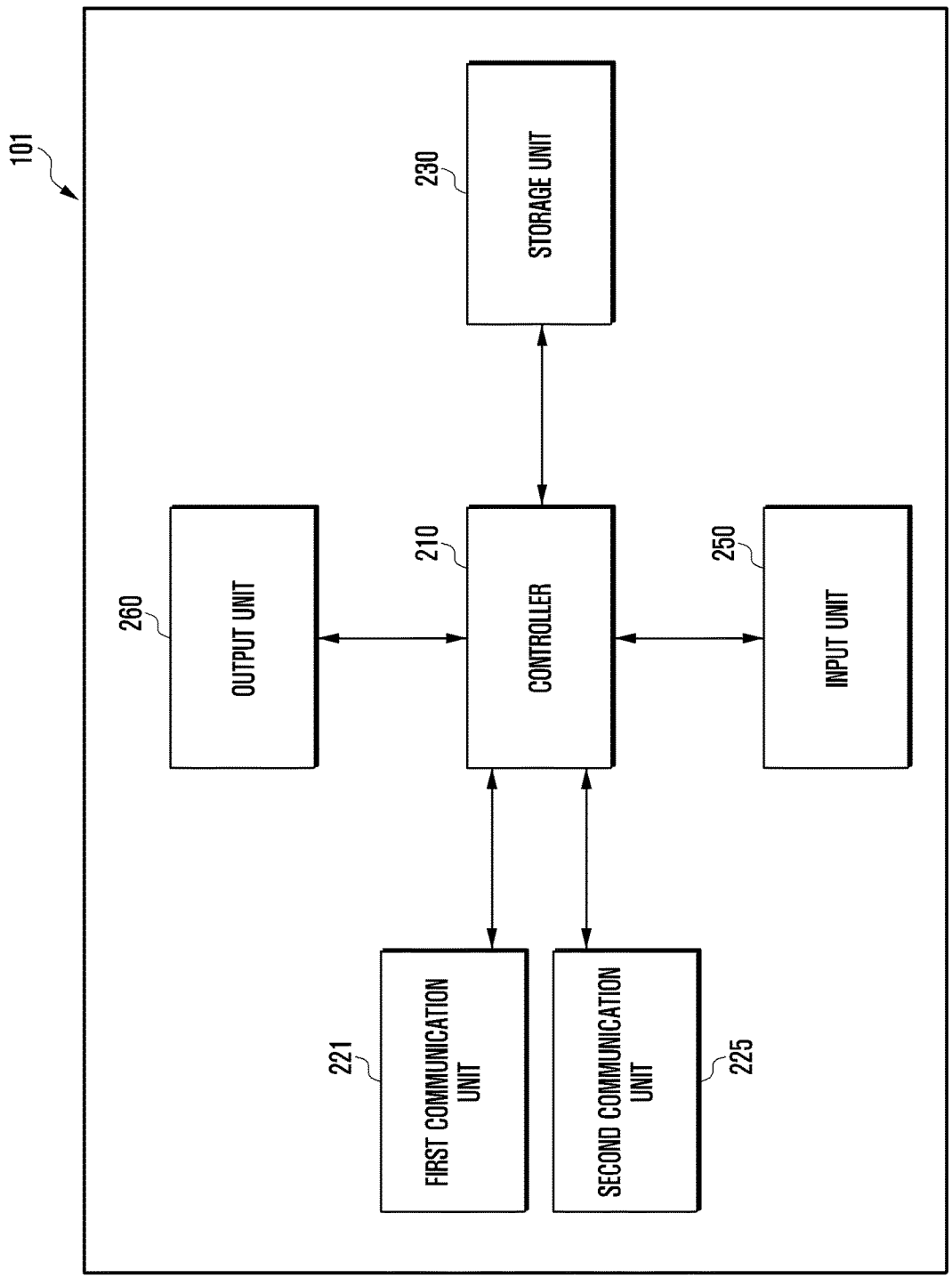
FIG. 2 is a block diagram of an electronic device according to an embodiment of the present invention.

FIG. 2 is a block diagram of an electronic device according to an embodiment of the present invention. In FIG. 2, a controller 210, a first communication unit 221, a second communication unit 225, an input unit 250, an output unit 260, and a storage unit 230 are shown.

The electronic device 101 may include: an input unit to receive user input; an output unit to present information; a first communication unit to communicate through a first communication scheme; a second communication unit to communicate through a second communication scheme; and a controller to perform transmitting ID information to a peripheral device through the first communication unit, receiving a UI for controlling the peripheral device from a server through the second communication unit, and transmitting peripheral device control information corresponding to the user input received via the input unit to the server through the second communication unit. In some embodiments, at least one of the components of the electronic device 101 may be omitted, or the electronic device 101 may further include another component.

The controller 210 may include one or more of a central processing unit (CPU), an application processor (AP), and a communication processor (CP). For example, the controller 210 may perform operations on control, communication and/or data processing for at least one component of the electronic device 101.

The controller 210 may control multiple hardware and software components connected thereto by running, e.g., the operating system or application programs, and perform various data processing operations and computations. The controller 210 may be implemented in, e.g., a system on chip (SoC). In one embodiment, the controller 210 may further include a graphics processing unit (GPU) and/or an image signal processor. The controller 210 may load a command or data from at least one of other components (e.g. non-volatile memory) on a volatile memory to process the command or data, and store various data in the non-volatile memory.

The storage unit 230 may include, for example, an internal memory or an external memory. The internal memory may include at least one of a volatile memory (e.g. dynamic random access memory (DRAM), static RAM (SRAM), synchronous dynamic RAM (SDRAM)) or a non-volatile memory (e.g. one time programmable read only memory (OTPROM), programmable ROM (PROM), erasable and programmable ROM (EPROM), electrically erasable and programmable ROM (EEPROM), mask ROM, flash ROM, flash memory (e.g. NAND flash, NOR flash), hard drive, or solid state drive (SSD)).

The external memory may include, for example, a flash drive, compact flash (CF) memory, secure digital (SD) memory, micro-SD memory, mini-SD memory, extreme digital (xD) memory, or memory stick. The external memory may be functionally and/or physically connected with the electronic device 101 via various interfaces.

The storage unit 230 may store instructions and/or data related to at least one component of the electronic device 101. In one embodiment, the storage unit 230 may store software and/or programs. For example, the programs may include a kernel, middleware, an application programming interface (API), and/or an application program (or "application"). At least a portion of the kernel, the middleware, and the API may be referred to as an operating system (OS).

The input unit 250 may include a touch panel, a (digital) pen sensor, a key, and an ultrasonic input tool. The touch panel may use at least one of capacitive, resistive, infrared, and ultrasonic schemes. The touch panel may further include a control circuit.

The (digital) pen sensor may include a recognition sheet as part of the touch panel or as a separate entity. The key may include a physical button, optical key, or key pad. The ultrasonic input tool may be used to identify data by sensing sound waves picked up by a microphone through an input tool generating ultrasonic waves.

The output unit 260 may include a visual output section, a sound output section, and a tactile output section.

The visual output section provides visual feedback, and may include a panel, a hologram device, or a projector. The panel may be implemented to be flexible, transparent, or wearable. The panel may be combined with the touch panel as a single module. The hologram device may present three dimensional images in the air by using interference of light. The projector may display an image by projecting light onto a screen. The screen may be located inside or outside the electronic device. In one embodiment, the visual output section may further include a control circuit to control the panel, the hologram device, or the projector.

The sound output section provides auditory feedback and can convert an electrical signal to sound. The sound output section may process sound information to be output through, e.g., a speaker, a receiver, or an earphone.

The tactile output section may provide tactile feedback, and may be, for example, a touch panel including a tactile layer.

The touch panel is also called a touchscreen and may include an input portion and an output portion. That is, the user can enter a command to the electronic device through the touchscreen, and the command processing result can be displayed on the touchscreen.

The first communication unit 221 and the second communication unit 225 may perform communication through different communication schemes.

The first communication unit 221 may perform communication through a first communication scheme. The first communication scheme may be short-range communication and may include wired communication and wireless communication. The first communication scheme may include, for example, Near Field Communication (NFC), Wi-Fi, infrared communication, ultrasound communication, Bluetooth Low Energy (BLE), and Visual Light Communication (VLC), which encodes information in a flicker that can be detected at close range.

The second communication unit 225 may perform communication through a second communication scheme. The second communication scheme may be long distance communication and may include wired communication and wireless communication.

The second communication scheme may include, for example, Long-Term Evolution (LTE), LTE advance (LTE-A), code division multiple access (CDMA), wideband CDMA (WCDMA), Universal Mobile Telecommunications System (UMTS), Wireless Broadband (WiBro), or Global System For Mobile Communications (GSM).

Figure 3:
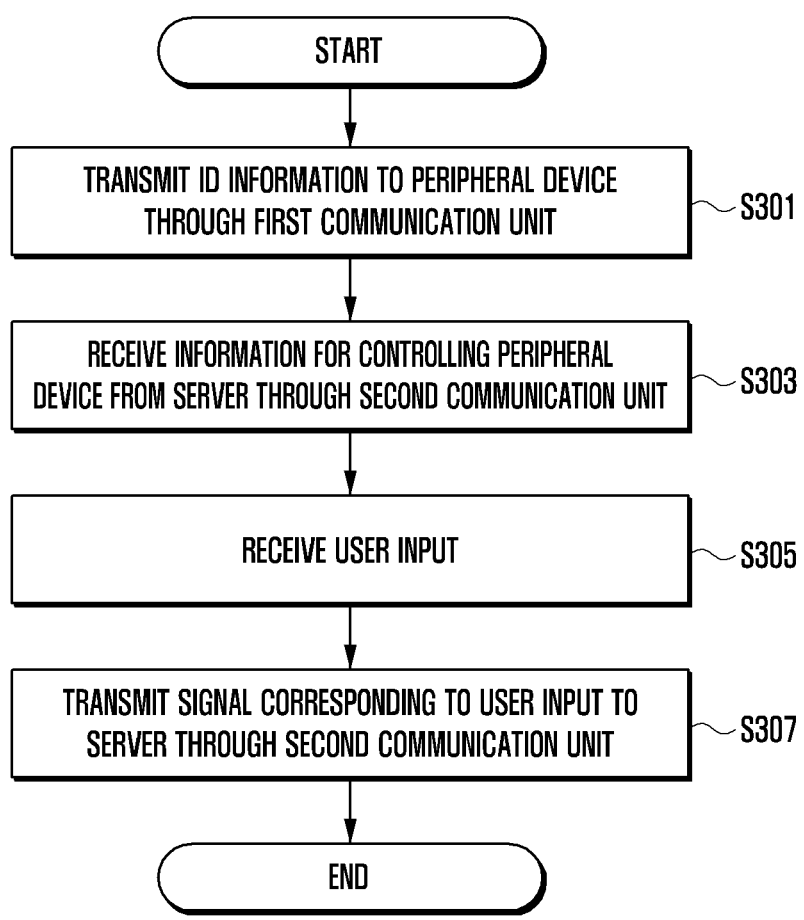
FIG. 3 is a flowchart depicting a procedure for the electronic device to control a peripheral device according to an embodiment of the present invention.

FIG. 3 is a flowchart depicting a procedure for the electronic device to control a peripheral device according to an embodiment of the present invention.

With reference to FIG. 3, at step S301, the electronic device transmit identification (ID) information thereof to at least one peripheral device. The electronic device may transmit ID information thereof to a peripheral device through the first communication unit. The electronic device may be a user terminal, and may be a mobile device such as a smartphone or tablet PC. The electronic device can advertise the ID information through the first communication unit. Advertising indicates transmitting information without specifying a specific target so that as many objects as possible can receive it. In wireless communication, a relatively small amount of information that is frequently advertised is called a beacon. That is, the ID information of the electronic device may be a beacon. A beacon service means that a device having received an advertised beacon performs a task directly or indirectly indicated by the beacon.

The ID information conforms to a predetermined format and includes a unique identifier assigned to each device. That is, ID information of each device must include unique identification information, and may include supplementary information indicating presence or absence of a speaker and a display.

The first communication unit may perform short-range communication to cause an event to occur in a peripheral device. For example, the electronic device may cause an event to occur in a peripheral device through an information broadcasting technology of short-range wireless communication such as BLE advertisement, or through a short-range sensing technology using out-of-band audible sound (ultrasound) with small transmission power that can only be received at close range, visual light communication (VLC) that encodes information in a flicker that can be detected at close range, or infrared (IR) light. That is, the peripheral device generates an event when it receives a signal advertised by the electronic device.

The means used by the electronic device to cause an event in a peripheral device (referred to as "event triggering means") may be a directional advertisement such as an IR signal, or an omnidirectional transmission using existing wireless communication such as BLE advertisement. The event triggering means may be advertised only according to user settings or manipulation. For example, the event triggering means may be advertised once when initiated by the user; or, once initiated by the user, the event triggering means may be continuously advertised until reception of a stop command. In the following description, BLE is mainly used as the event triggering means.

The electronic device can encode or carry specific information using BLE, and can specify different meanings depending on signal strength. For example, the electronic device may include uniquely assigned information in the data payload of the BLE advertisement.

The peripheral device receives a signal transmitted from the electronic device and generates an event. When an event occurs in the peripheral device, the peripheral device extracts the ID information from the received signal.

The peripheral device may transmit the extracted ID information of the electronic device to the server. The peripheral device can transmit the server the ID information of the electronic device and the state information of the peripheral device through the second communication scheme.

The server may retrieve first information stored in the server for controlling the peripheral device on the basis of the ID information received from the peripheral device, and may transmit the first information and/or the state information of the peripheral device to the electronic device. Here, the server may transmit the first information and/or the state information of the peripheral device to the electronic device through the second communication scheme.

The first information may be a user interface for controlling the peripheral device, or path information of the location where the user interface is stored, i.e., an address in the server. That is, the first information may be a uniform resource locator (URL) link to a stored user interface for controlling the peripheral device, or may be a path of specific data stored in the storage of the electronic device.

The electronic device receives the first information and/or the state information of the peripheral device from the server. For example, at step S303, the electronic device may receive information for controlling the peripheral device and/or state information of the peripheral device from the server through the second communication unit. The electronic device may provide the output unit with information for controlling the peripheral device received from the server, i.e. the first information and/or the state information of the peripheral device. The output unit may provide visual, audible, and/or tactile feedback. For example, when the output unit is a touchscreen, the electronic device may display the first information and/or the state information of the peripheral device on the touchscreen. The electronic device may convert the received first information and/or the state information of the peripheral device into a sound signal and output the sound signal through the speaker. In addition, the electronic device may convert the received first information and/or the state information of the peripheral device into tactile information and output the same in a vibration pattern that the user can perceive as tactile feedback.

After providing the output unit with the first information and/or the state information of the peripheral device, at step S305, the electronic device may receive user input through the input unit.

The input unit may receive user input in the form of at least one of voice, touch, and motion. For example, to reduce the volume of the TV, if the user issues a voice command "volume down", the volume of the TV may be reduced in response to the voice input. When the user touches the touchscreen of the electronic device, the volume of the TV may be reduced in response to the touch input. If the user shakes the electronic device, the volume of the TV may be reduced in response to the motion input.

The electronic device may transmit a signal corresponding to the user input to the server. For example, at step S307, the electronic device receives a user input through the input unit and transmits a signal corresponding to the user input to the server through the second communication unit. The signal may be control data for a peripheral device. In addition, the user input received by the electronic device may be information indicating a location of the server where control data for controlling the peripheral device is stored.

FIG. 4A illustrates an embodiment for controlling a peripheral device using the electronic device according to an embodiment of the present invention.

In FIG. 4A, an electronic device 101, a peripheral device 102, and a server 106 are shown. The electronic device 101 may transmit the ID information thereof (407). Then, the peripheral device 102 may receive the ID information of the electronic device 101. The peripheral device 102 may be a TV. The electronic device 101 may transmit the ID information to the peripheral device 102 through the first communication unit. The first communication unit may transmit the ID information to the peripheral device 102 via short-range communication. For example, the electronic device 101 may transmit the ID information to the peripheral device 102 through BLE (407).

Although BLE advertisement does not carry much information, it may be transmitted at intervals of a few hundredths of a second while consuming very little energy. The BLE advertisement packet is 47 bytes in total, and the payload is 31 bytes and can be used to advertise desired information.

When the peripheral device 102 receives a BLE advertisement packet, it extracts ID information of the electronic device 101 from the received BLE advertisement packet. For example, the peripheral device 102 may extract a given number of characters from the payload of the BLE advertisement packet and resolve the characters with a security key to obtain the unique identification information of the electronic device 101. For instance, the peripheral device 102 may extract the ID information and identify unique identification information "chulsoo". The peripheral device 102 may send the unique identification information "chulsoo" to the server 106 to check whether device information corresponding to "chulsoo" is stored in the server 106. Meanwhile, the peripheral device 102 may not only provide the unique identification information of the electronic device to the server 106 but also forward the ID information received from the electronic device 101 to the server 106. In this case, the server 106 may identify the unique identification information of the electronic device 101 on the basis of the ID information received from the peripheral device 102.

Upon receiving ID information of the electronic device 101 and state information of the peripheral device 102 from the peripheral device 102, the server 106 may identify the electronic device 101 based on the ID information of the electronic device 101 and may retrieve first information matching the peripheral device 102 based on the state information of the peripheral device 102. The first information may include control data and user interface information for controlling a function of the peripheral device 102.

When the electronic device 101 is subscribed to the service provided by the server 106, the server 106 may store various information including at least one piece of unique identification information associated with the electronic device 101. For example, the above information may include a Bluetooth device address, service identification information, current communication availability, and the gender and age of the electronic device owner.

When the peripheral device 102 is subscribed to the service provided by the server 106, the server 106 may store the first information required to control the function of the peripheral device 102. The first information may include data enabling the server 106 to control the function of the peripheral device 102, a user interface for controlling the function of the peripheral device 102, or data for generating such a user interface in real time.

The server 106 may retrieve a user interface 405 for controlling the peripheral device 102 from the storage based on the state information received from the peripheral device 102, and transfer the user interface 405 to the electronic device 101.

The server 106 may extract information related to the electronic device 101 among information stored in the server 106 based on the ID information of the electronic device received from the peripheral device 102, and may send a user interface for controlling the peripheral device 102 to the electronic device 101. For example, information regarding the display resolution and communication scheme of the electronic device 101 may be stored in the server 106. The server 106 may adjust the user interface for controlling the peripheral device 102 according to the display resolution of the electronic device 101 and send the adjusted user interface to the electronic device 101. The user interface transmitted to the electronic device 101 may include web information encoded in, for example, Hypertext Markup Language (HTML) or Extensible Markup Language (XML), and the electronic device 101 may display the user interface by executing a web browser.

The server 106 may transmit a user interface for controlling the peripheral device to the electronic device 101 through the second communication scheme (403). The second communication scheme may be long distance communication.

Figure 4B:
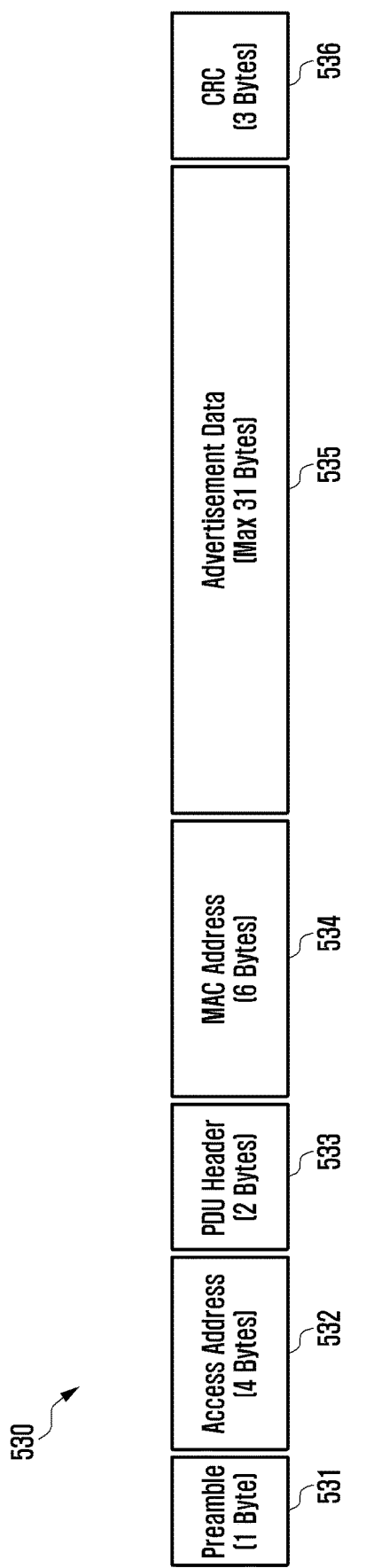
FIG. 4B illustrates the format of packet data advertised by the electronic device according to an embodiment of the present invention.

FIG. 4B illustrates the format of packet data advertised by the electronic device according to an embodiment of the present invention.

With reference to FIG. 4B, the packet data 530 has a length of 47 bytes, and includes fields for preamble 531, access address 532, PDU header 533, MAC address 534, advertisement data 535, and CRC 536. The advertisement data 535 has a length of 31 bytes and may include ID information of an electronic device. Upon reception of the packet data 530, the peripheral device may extract ID information of the electronic device included in the advertisement data and transmit the ID information to the server.

Figure 4C:
FIG. 4C is an illustration of the user interface received by the electronic device according to an embodiment of the present invention.

FIG. 4C is an illustration of the user interface received by the electronic device according to an embodiment of the present invention.

FIG. 4C shows a user interface 551 and a URL 553 indicating a stored user interface. The user interface 551 may be stored in the server, and the address information (URL 553) for the location on the server where the user interface 551 is stored may be transmitted to the electronic device via the second communication scheme. That is, the electronic device can receive information corresponding to the user interface from the server by referring to the received URL 553. For example, the above information may be image information. The electronic device may receive the user interface directly from the server; and upon reception of the address information in the server where the user interface is stored from the server, the electronic device may also receive the user interface stored in the server on the basis of the address information. In addition, the user interface may be stored in an entity other than the server; and the electronic device may receive address information of the entity storing the user interface from the server, and may receive the user interface on the basis of the address information.

Figure 5:
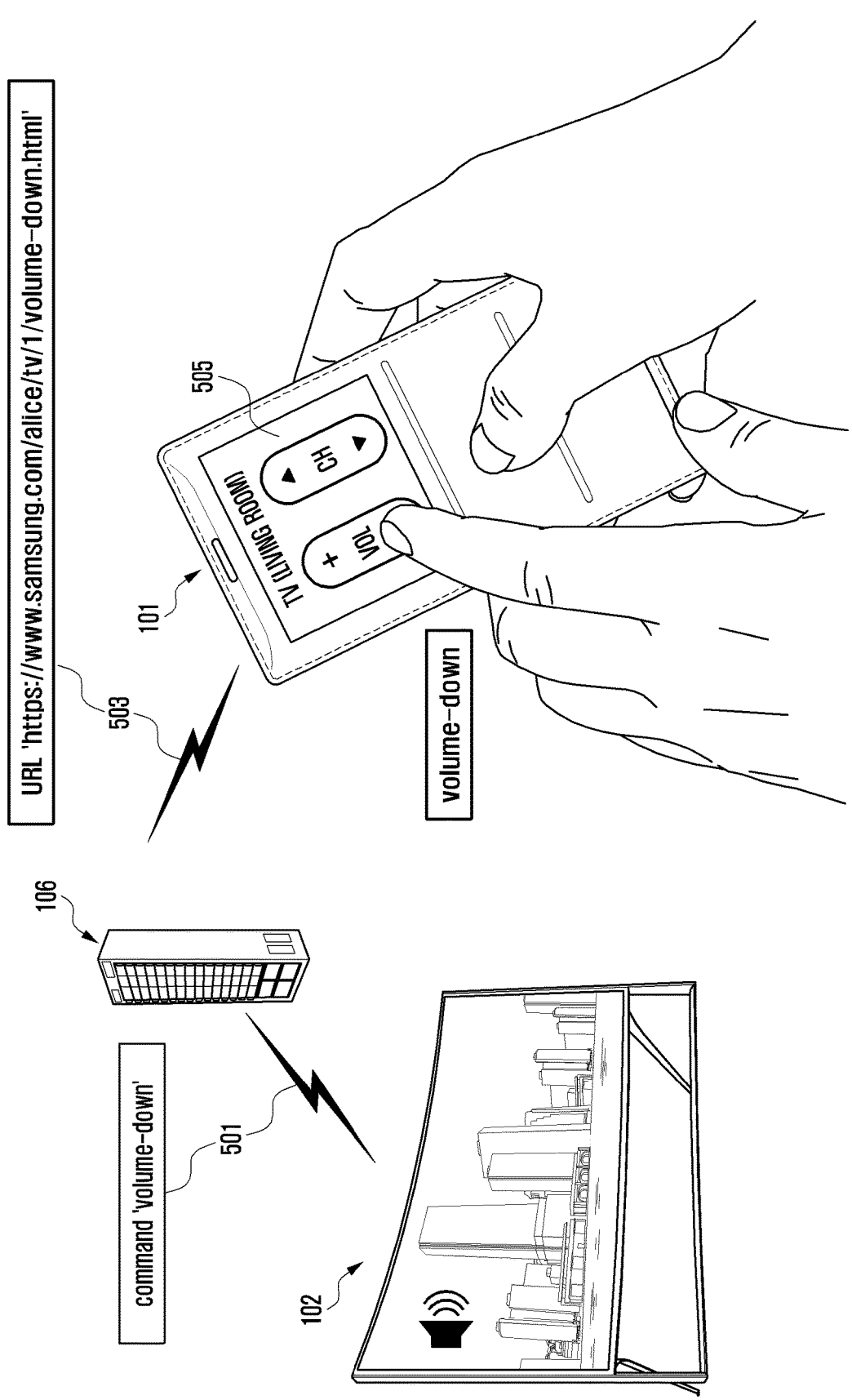
FIG. 5 is an illustration of data used by the electronic device to control a peripheral device according to an embodiment of the present invention.

FIG. 5 is an illustration of data used by the electronic device to control a peripheral device according to an embodiment of the present invention.

In FIG. 5, an electronic device 101, a server 106, and a peripheral device 102 are shown. The electronic device 101 may be a smartphone. The peripheral device 102 may be a TV.

The electronic device 101 may receive a user interface from the server 106. The electronic device 101 may provide the output unit with the user interface received from the server 106. For example, when the electronic device 101 includes a touchscreen, the user interface 505 for controlling the peripheral device 102 may be displayed on the touchscreen. The user interface 505 may include web information encoded in, for example, HTML or XML. The electronic device 101 may display the user interface 505 by executing a web browser.

To reduce the volume of the nearby TV 102 using the user interface displayed on the touchscreen, the user may touch the volume-down button of the user interface displayed on the touchscreen. Then, the electronic device 101 may receive the user input and transmit data 503 for controlling the peripheral device (e.g. TV) to the server 106 in response to the user input. For example, a volume-down command may be sent to the server 106 through the second communication unit. Here, the data 503 sent to the server 106 may be a uniform resource locator (URL) corresponding to the volume-down command. That is, the electronic device 101 may send the server 106 location information of a location of the server where the command corresponding to the user input is stored. The location information may be an address of a location where the command is stored.

The server 106 may control the peripheral device 102 according to the data received from the electronic device 101 for controlling the peripheral device 102. The server 106 may retrieve command data corresponding to user input on the basis of the location information received from the electronic device 101, and may control the peripheral device 102 by sending the command data to the peripheral device 102. For example, when the user touches the volume-down button of the user interface displayed on the electronic device 101, the location information indicating the location of the server where the command data corresponding to the volume-down button is stored is sent to the server 106, and the server 106 may retrieve the command data based on the location information. Then, the server 106 may reduce the volume of the TV by sending the retrieved volume-down data 501 to the peripheral device 102 (TV).

Figure 6:
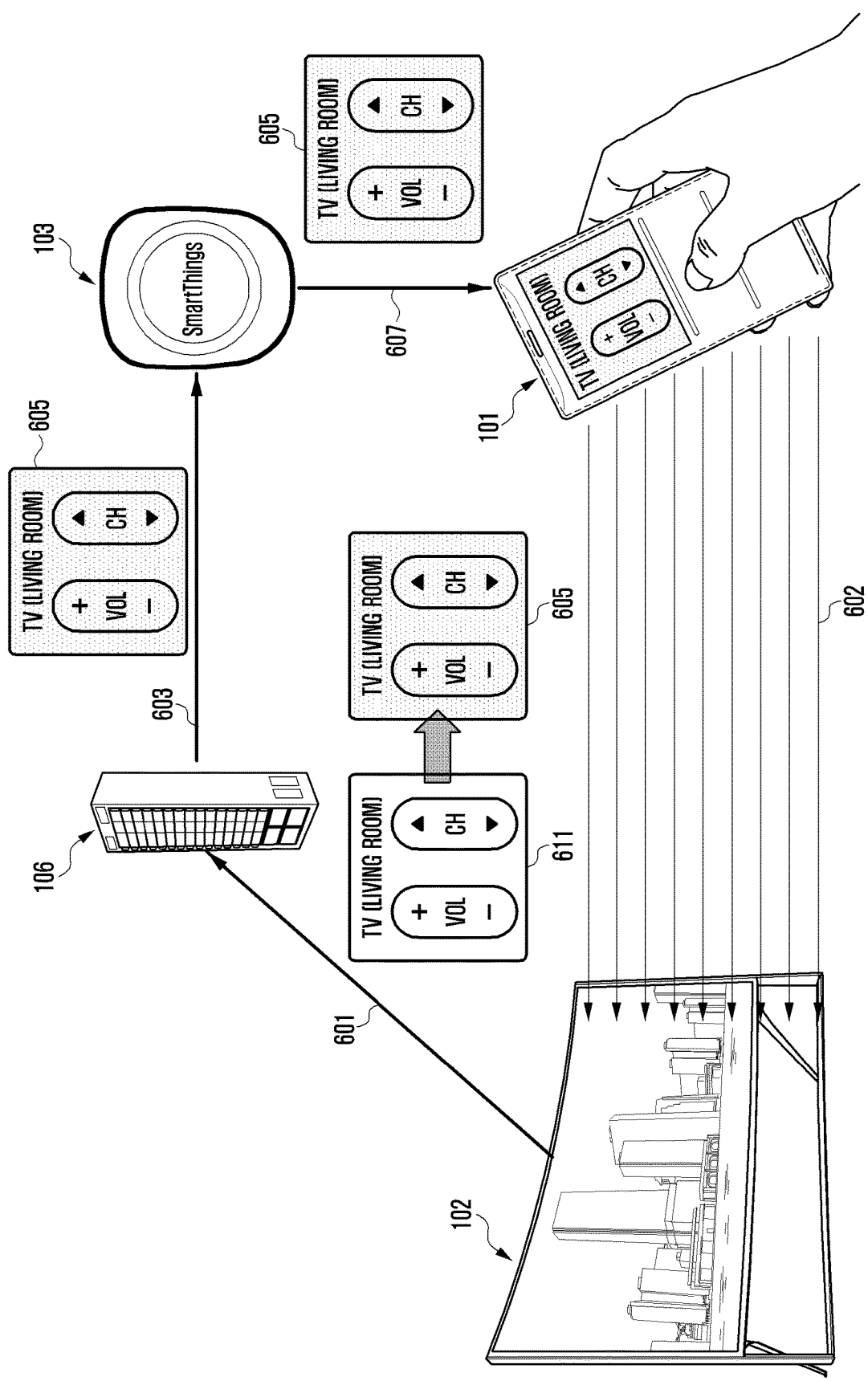
FIG. 6 illustrates a procedure for controlling a peripheral device using a local hub according to another embodiment of the present invention.

FIG. 6 illustrates a procedure for controlling a peripheral device using a local hub according to another embodiment of the present invention.

In FIG. 6, an electronic device 101, a peripheral device 102, a server 106, and a local hub 103 are shown. The local hub 103, the electronic device 101, and the peripheral device 102 may form a local network. The local network may be a short-range network using the first communication scheme rather than the second communication scheme. For example, the electronic device 101 and the peripheral device 102 may perform communication using BLE; the electronic device 101, the peripheral device 102, and the local hub 103 may perform communication using Wi-Fi; and the electronic device 101, the peripheral device 102, the local hub 103, and the server 106 may perform communication using cellular communication such as LTE and other long-distance wired networks.

When the electronic device 101 advertises ID information through BLE (602), the peripheral device 102 may receive the advertisement packet and extract the ID information of the electronic device 101. The ID information of the electronic device 101 may include information on a local hub forming a local network together with the electronic device. For example, the ID information of the electronic device 101 may include the MAC address of the local hub 103.

The peripheral device 102 transmits the ID information of the electronic device extracted from the advertisement packet and the state information of the peripheral device 102 to the server 106 (601). The state information of the peripheral device 102 may include information on a local hub forming a local network together with the peripheral device 102. For example, the state information of the peripheral device 102 may include the MAC address of the local hub 103. If the electronic device 101 and the peripheral device 102 form a network with the same local hub, the local hub information may be the same.

The server 106 may identify the electronic device 101 based on the received ID information of the electronic device 101 and the state information of the peripheral device 102. The server 106 may also identify the local hub 103 based on the local hub information contained in the ID information of the electronic device 101. In addition, the server 106 may be aware that the electronic device 101, the peripheral device 102, and the local hub 103 form a network on the basis of the ID information of the electronic device 101 and the state information of the peripheral device 102.

When the electronic device 101, the peripheral device 102 and the local hub 103 form a network, the server 106 may transmit the local hub 103 the state information of the peripheral device 102 and a second user interface 605 for controlling the peripheral device 102 (603). The second user interface 605 is a modified version of the first user interface 611 in accordance with the local hub 103. The first user interface 611 is generated when the electronic device 101 is registered in the server 106, and the destination address included in the first user interface 611 may be the address of the server 106. The destination address included in the second user interface 605 may be the address of the local hub 103. That is, the server 106 may generate the second user interface 605 by changing the destination address included in the first user interface 611 to the address of the local hub 103. The destination address may be an address of a location where, when user input is received by the electronic device 101, data displayed on the electronic device 101 in response to the user input and data for executing a corresponding command are stored. That is, the local hub 103 may perform the role of the server 106, and can execute a command to control the peripheral device 102. The local hub 103 may forward the second user interface 605 received from the server 106 to the electronic device 101 (607).

The electronic device 101 may output the second user interface 605 received from the local hub 103. The electronic device 101 may sense user input for controlling the peripheral device 102 through the second user interface 605. The local hub 130 may control the peripheral device 102 based on the data for controlling the peripheral device 102 received from the electronic device 101. The local hub 106 may retrieve the command data corresponding to the user input based on the location information received from the electronic device 101, and may control the peripheral device 102 by transmitting the command data to the peripheral device 102. For example, when the user touches the volume-down button of the user interface displayed on the electronic device 101, the location information of a location of the local hub 103 where the command data corresponding to "volume-down" is stored is transmitted to the local hub 103, and the local hub 103 retrieves the volume-down command data stored therein based on the location information. Then, the local hub 103 may reduce the TV volume by sending the retrieved volume-down data to the peripheral device 102 (TV).

As the local hub 103 forms a network together with the electronic device 101 and the peripheral device 102 through short-range communication, it is possible to reduce the latency and response time compared with the case where the server 106 controls the peripheral device 102.

Figure 7:
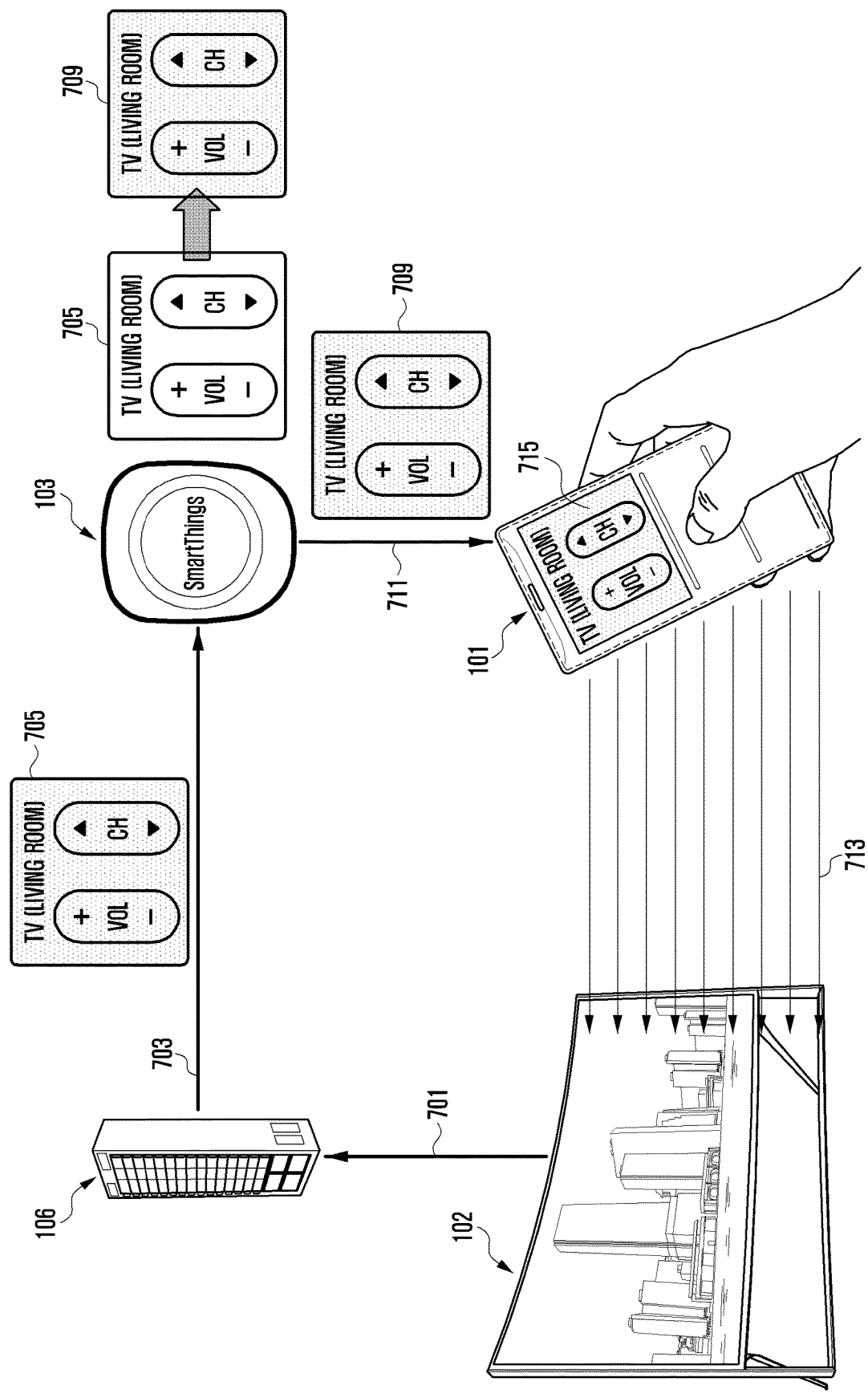
FIG. 7 illustrates a procedure for controlling a peripheral device using a local hub according to another embodiment of the present invention.

FIG. 7 illustrates a procedure for controlling a peripheral device using a local hub according to another embodiment of the present invention.

In FIG. 7, an electronic device 101, a peripheral device 102, a server 106, and a local hub 103 are shown. The local hub 103, the electronic device 101, and the peripheral device 102 may form a local network. The local network may be a short-range network using the first communication scheme rather than the second communication scheme. For example, the electronic device 101 and the peripheral device 102 may perform communication using BLE; the electronic device 101, the peripheral device 102, and the local hub 103 may perform communication using Wi-Fi; and the electronic device 101, the peripheral device 102, the local hub 103, and the server 106 may perform communication using LTE.

When the electronic device 101 advertises ID information through BLE (713), the peripheral device 102 may receive the advertisement packet and extract the ID information of the electronic device 101. The ID information of the electronic device 101 may include information on a local hub forming a local network together with the electronic device. For example, the ID information of the electronic device 101 may include the MAC address of the local hub 103.

The peripheral device 102 transmits the ID information of the electronic device 101 extracted from the advertisement packet and the state information of the peripheral device 102 to the server 106 (701). The state information of the peripheral device 102 may include information on a local hub forming a local network together with the peripheral device 102. For example, the state information of the peripheral device 102 may include the MAC address of the local hub 103. If the electronic device 101 and the peripheral device 102 form a network with the same local hub, the local hub information may be the same.

The server 106 may identify the electronic device 101 based on the received ID information of the electronic device 101 and the state information of the peripheral device 102. The server 106 may also identify the local hub 103 based on the local hub information contained in the ID information of the electronic device 101. In addition, the server 106 may be aware that the electronic device 101, the peripheral device 102, and the local hub 103 form a network on the basis of the ID information of the electronic device and the state information of the peripheral device.

When the electronic device 101, the peripheral device 102 and the local hub 103 form a network, the server 106 may transmit the local hub 103 the state information of the peripheral device 102 and a first user interface 705 for controlling the peripheral device 102 (703). The local hub 103 may change the received first user interface 705 to a second user interface 709 in accordance with the local hub 103.

The first user interface 705 is generated when the electronic device 101 is registered in the server 106, and the destination address included in the first user interface 705 may be the address of the server 106. The destination address included in the second user interface 709 may be the address of the local hub 103. That is, the local hub 103 may generate the second user interface 709 by changing the destination address included in the first user interface 705 to the address of the local hub 103. The destination address may be an address of a location where, when user input is received by the electronic device 101, data displayed on the electronic device 101 in response to the user input and data for executing a corresponding command are stored. That is, the local hub 103 may perform the role of the server 106, and can execute a command to control the peripheral device 102. The local hub 103 may forward the second user interface 709 to the electronic device 101 (711).

As the local hub 103 forms a network together with the electronic device 101 and the peripheral device 102 through short-range communication, it is possible to reduce the latency and response time compared with the case where the server 106 controls the peripheral device 102.

Figure 8:
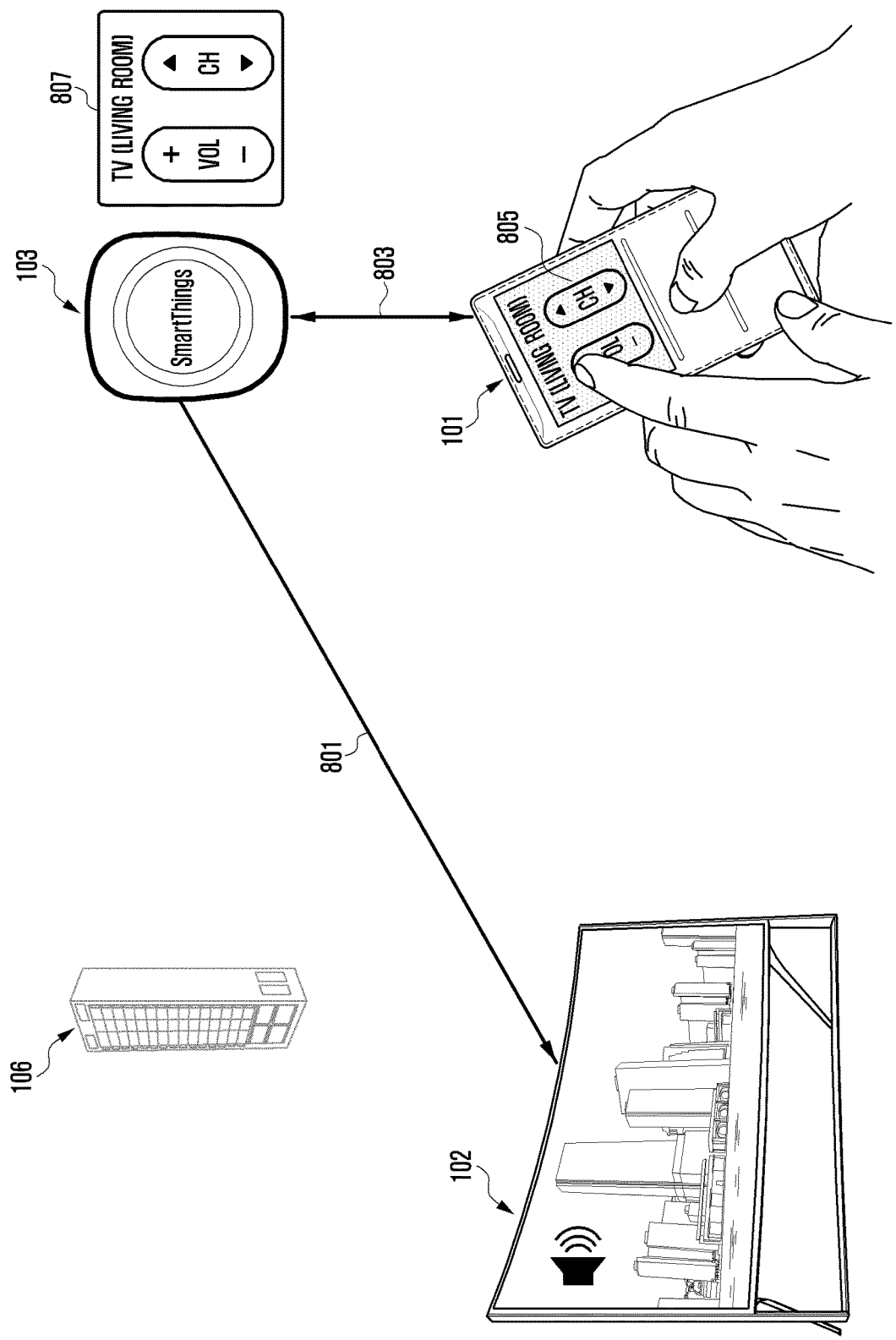
FIG. 8 illustrates a procedure for controlling a peripheral device using a local hub according to another embodiment of the present invention.

FIG. 8 illustrates a procedure for controlling a peripheral device using a local hub according to another embodiment of the present invention.

In FIG. 8, an electronic device 101, a peripheral device 102, a server 106, and a local hub 103 are shown. The local hub 103, the electronic device 101, and the peripheral device 102 may form a local network. The local network may be a short-range network using the first communication scheme rather than the second communication scheme. For example, the electronic device 101 and the peripheral device 102 may perform communication using BLE; the electronic device 101, the peripheral device 102, and the local hub 103 may perform communication using Wi-Fi; and the electronic device 101, the peripheral device 102, the local hub 103, and the server 106 may perform communication using LTE.

The electronic device 101 may include a touchscreen. When the electronic device 101 receives a second user interface from the local hub 103 (803), the second user interface 807 may be displayed on the touchscreen. The second user interface may include a destination address, and the destination address may be the address of the local hub 103. The destination address included in the second user interface 807 may be the address of the local hub 103. When the user touches the second user interface displayed on the electronic device 101, the electronic device 101 may receive the user input and transmit data corresponding to the user input to the local hub 103. Upon reception of the data, the local hub 103 may transmit a command corresponding to the data to the peripheral device 102 (801), and the peripheral device 102 may perform a function corresponding to the data.

For example, when the user touches a volume-down button of the second user interface displayed on the electronic device 101, the electronic device 101 may transmit data corresponding to the volume-down button to the local hub 103. The local hub 103 may transmit a command corresponding to the volume-down button to the peripheral device 102, and the peripheral device 102 may reduce the sound volume according to the received command.

Figure 9:
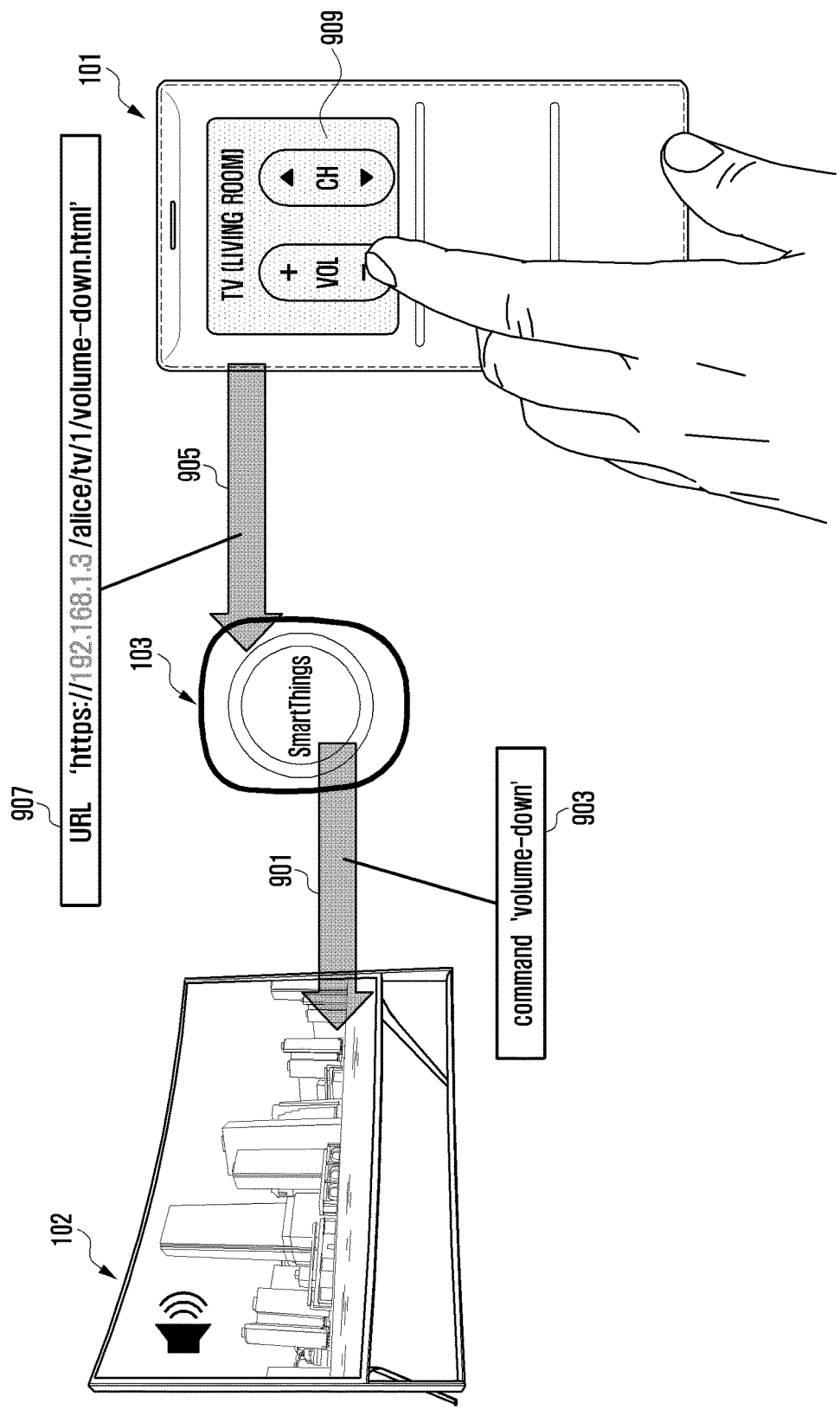
FIG. 9 illustrates data that is sent during a process of controlling a peripheral device using a local hub according to another embodiment of the present invention.

FIG. 9 illustrates data that is sent during a process of controlling a peripheral device using a local hub according to another embodiment of the present invention.

In FIG. 9, an electronic device 101, a local hub 103, and a peripheral device 102 are shown. The electronic device 101 may be a smartphone. The peripheral device 102 may be a TV.

A second user interface 909 for controlling the peripheral device 102 received from the local hub 103 may be displayed on the touchscreen of the electronic device 101. The second user interface 909 may include web information encoded in HTML or XML. The electronic device 101 may display the second user interface 909 by executing a web browser. The electronic device 101 may include a touchscreen, and the second user interface 909 may be displayed on the touchscreen. To reduce the volume of the nearby TV 102 using the second user interface 909 displayed on the touchscreen, when the user touches the volume-down button of the second user interface displayed on the touchscreen, the electronic device 101 may receive the user input and send a volume-down command to the local hub 103 (905). Here, the data 907 being sent to the local hub 103 may be a URL corresponding to the volume-down command. That is, the electronic device 101 may send the local hub 103 the location information of a location of the local hub 103 where a command corresponding to user input is stored. The location information may be the address of a location where the command is stored.

The local hub 103 may retrieve a command corresponding to the user input on the basis of the location information received from the electronic device 101, and may control the peripheral device 102 by sending the command to the peripheral device 102. For example, when the user touches the volume-down button of the user interface displayed on the electronic device 101, the location information indicating the location of the local hub 103 where the command corresponding to the volume-down button is stored is sent to the local hub 103, and the local hub 103 may retrieve the volume-down command stored in the local hub 103 based on the location information. Then, the local hub 103 may reduce the volume of the peripheral device 102 by sending the retrieved volume-down command 903 to the peripheral device 102.

Figure 10:
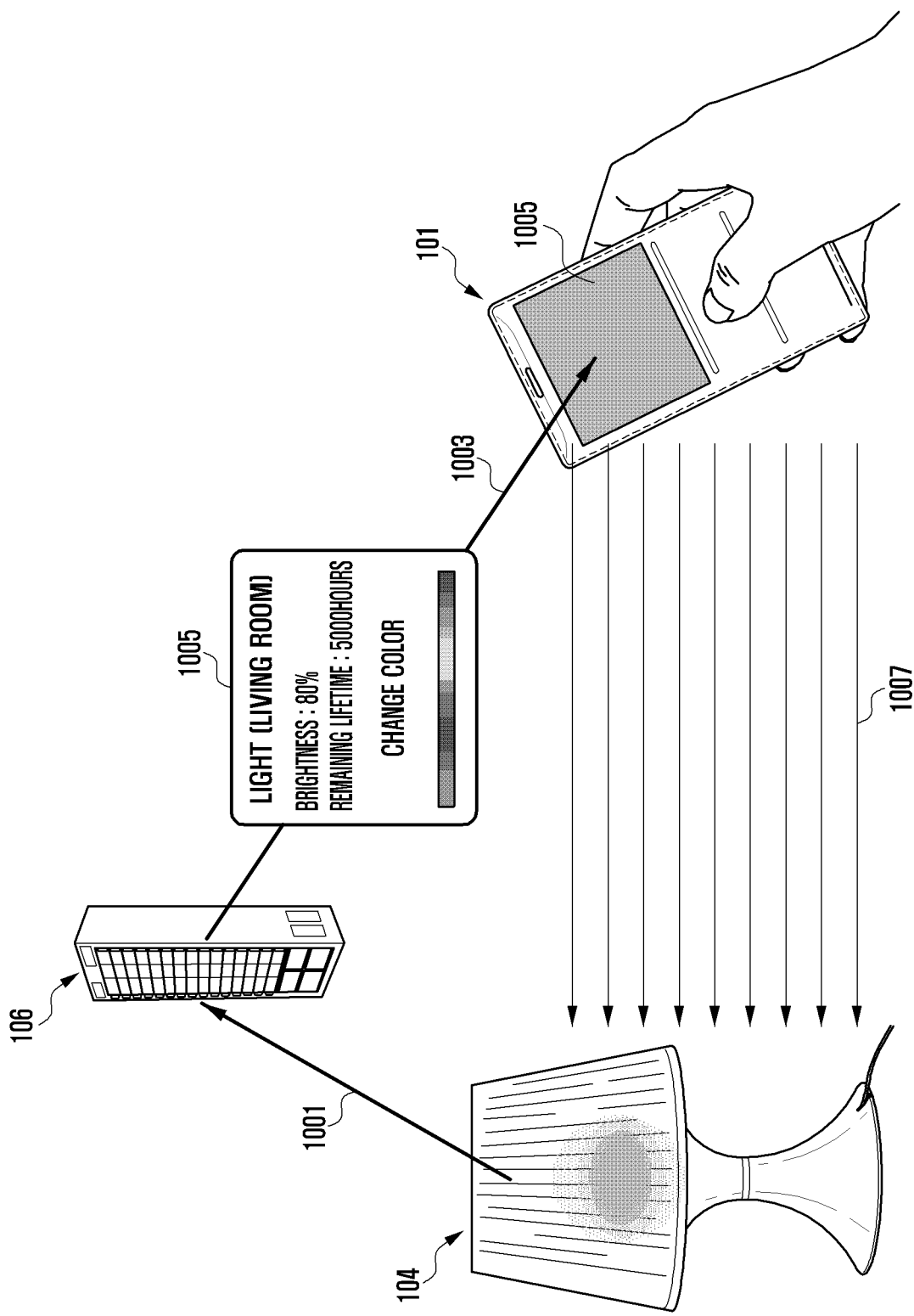
FIG. 10 illustrates a process whereby the electronic device receives a user interface from the server to control a smart light according to another embodiment of the present invention.

FIG. 10 illustrates a process whereby the electronic device receives a user interface from the server to control a smart light according to another embodiment of the present invention.

In FIG. 10, an electronic device 101, a peripheral device 104, and a server 106 are shown. The electronic device 101 may advertise ID information thereof (1007). When the electronic device 101 advertises ID information, the peripheral device 104 may receive the ID information. The peripheral device 104 may be a smart light. The electronic device 101 may transmit the ID information to the smart light 104 through the first communication unit (1007). The first communication unit may transmit the ID information to the smart light 104 through short-range communication. For example, the electronic device 101 may advertise the ID information to the smart light 104 through BLE (1007).

When the smart light 104 receives a BLE advertisement packet, it extracts the ID information of the electronic device 101 from the received BLE advertisement packet. The smart light 104 transmits the extracted ID information of the electronic device 101 to the server 106 (1001).

Upon receiving the ID information of the electronic device 101 and the state information of the smart light 104 from the smart light 104, the server 106 may identify the electronic device 101 based on the ID information of the electronic device 101 and may retrieve the first information corresponding to the smart light 104 based on the state information of the smart light 104. The state information of the smart light 104 may include information regarding ID information, current color, current illuminance, life time, and location of the smart light 104.

The first information may include control data for controlling the brightness, color, and on/off time of the smart light 104 and user interface information for controlling the smart light 104.

The server 106 may retrieve a user interface 1005 for controlling the smart light 104 from the storage thereof based on the state information of the smart light 104 received from the smart light 104, and transmit the user interface 1005 and the state information of the smart light 104 to the electronic device 101 (1003).

The user interface transmitted to the electronic device 101 may include web information encoded in HTML or XML, and the electronic device 101 may display the user interface by executing a web browser.

The server 106 may transmit the user interface 1005 for controlling the smart light 104 to the electronic device 101 through the second communication scheme (1003). The second communication scheme may be long distance communication.

Figure 11:
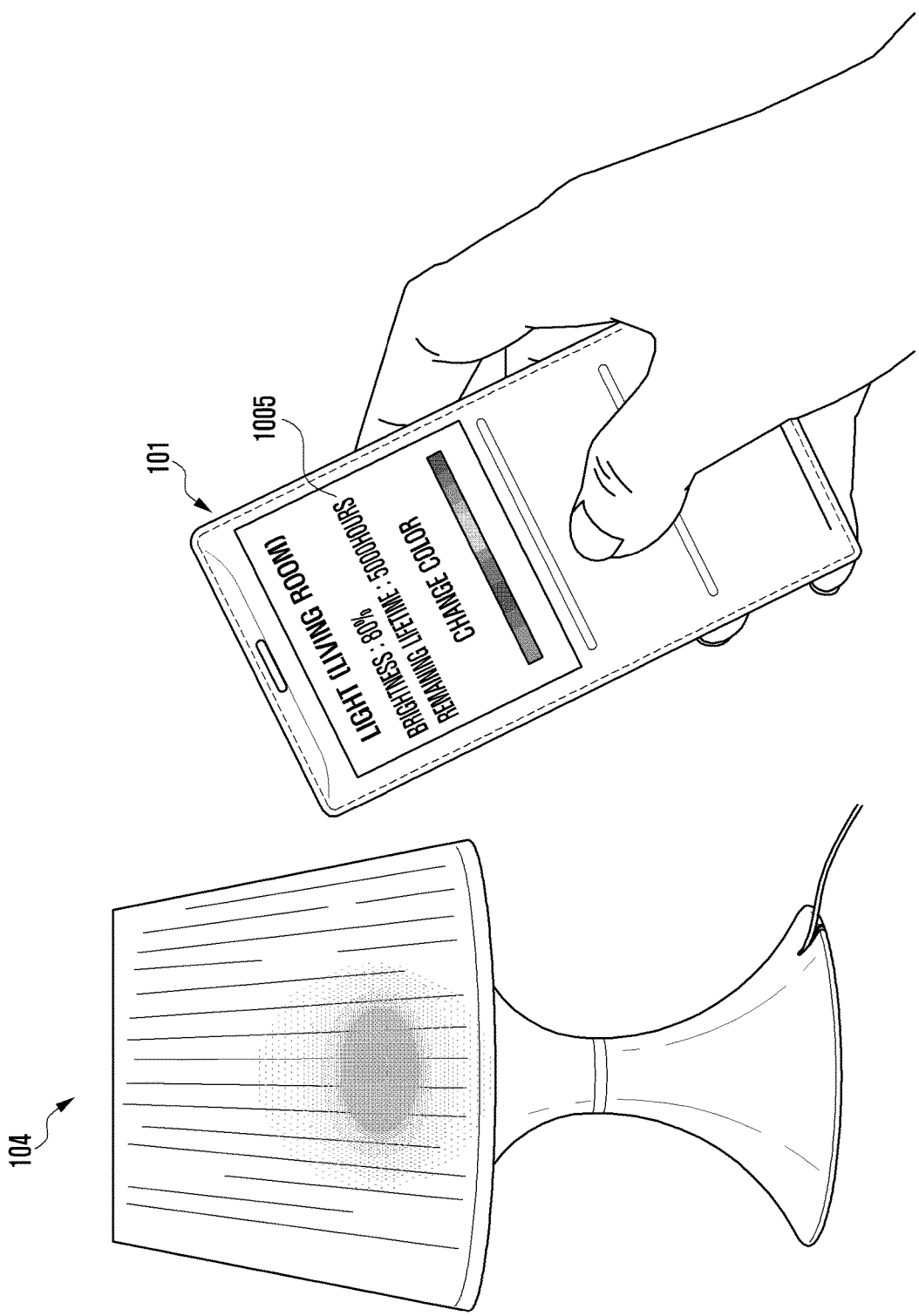
FIG. 11 illustrates a process whereby the electronic device controls a smart light according to another embodiment of the present invention.

FIG. 11 illustrates a process whereby the electronic device controls a smart light according to another embodiment of the present invention.

In FIG. 11, an electronic device 101 and a smart light 104 are shown. The electronic device 101 may display a user interface 1005 for controlling the smart light 104 and the current state information of the smart light 104. For example, the installation location, current illuminance, and remaining lifetime of the smart light 104 may be displayed on the electronic device 101. A user interface for changing the color of the smart light 104 may also be displayed on the electronic device 101.

The electronic device 101 may receive user input through the displayed user interface and send data corresponding to the user input to the server. Based on the received data, the server may change the color of the smart light 104 by sending a color-change command to the smart light 104.

For example, in a state where the user interface for changing the color of the smart light 104 is displayed on the electronic device 101, when the user moves the finger left and right on the touchscreen, the color of the smart light 104 may be changed according to the color information indicated by the movement of the finger.

Figure 12:
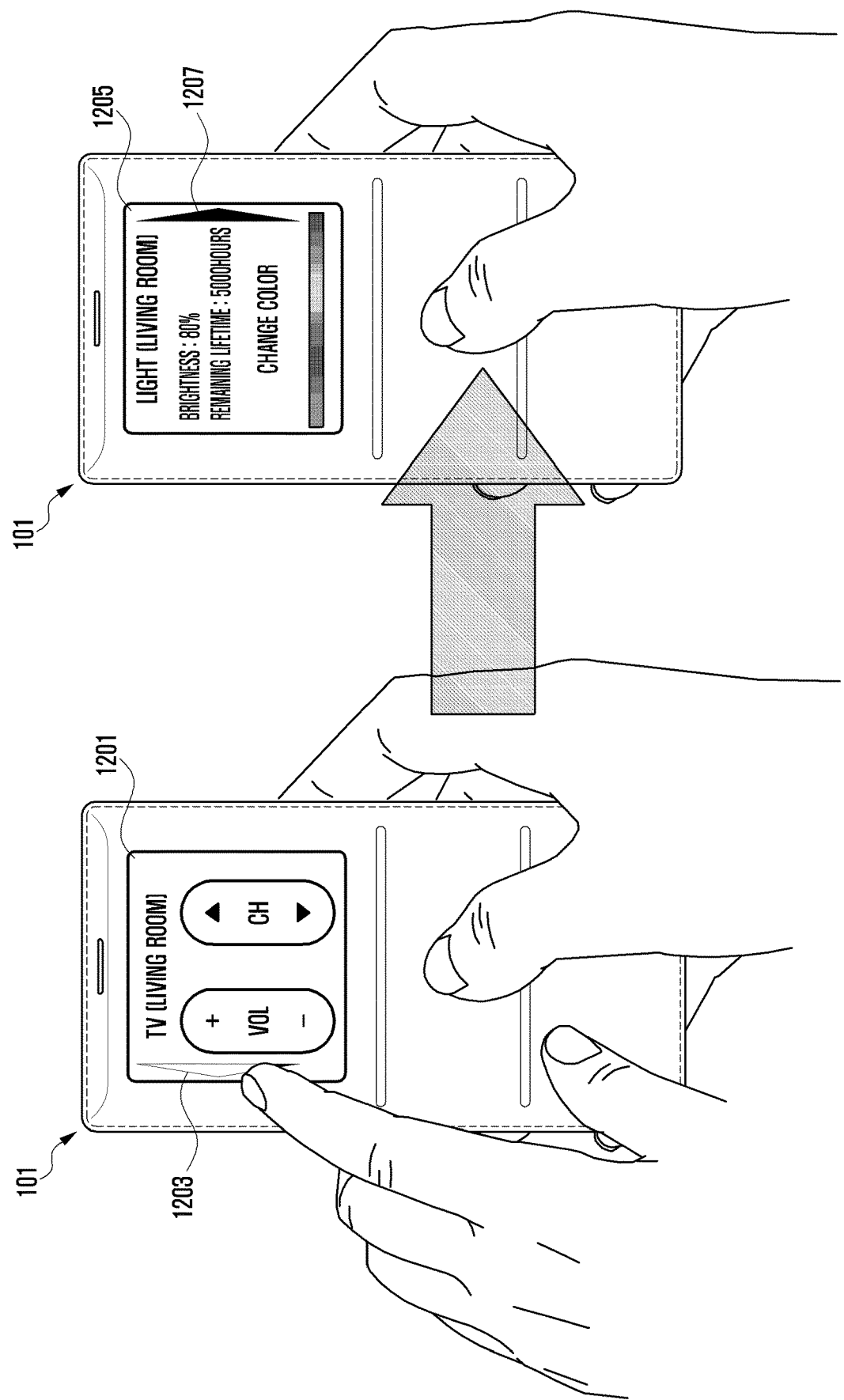
FIG. 12 illustrates a process whereby the electronic device switches user interface windows to control multiple peripheral devices according to another embodiment of the present invention.

FIG. 12 illustrates a process whereby the electronic device switches user interface windows to control multiple peripheral devices according to another embodiment of the present invention.

In FIG. 12, the electronic device 101 displays user interfaces 1201 and 1205. The first user interface 1201 is a user interface for controlling a TV, and the second user interface 1205 is a user interface for controlling a smart light.

When there are multiple peripheral devices including a first peripheral device and a second peripheral device in the vicinity of the electronic device 101, the multiple peripheral devices may each receive a packet advertised by the electronic device 101. That is, when there are the first peripheral device and the second peripheral device in the vicinity of the electronic device 101, the first peripheral device and the second peripheral device may each receive a packet advertised by the electronic device 101.

The first peripheral device may transmit the state information of the first peripheral device and the ID information of the electronic device 101 to the server; and the second peripheral device may transmit the state information of the second peripheral device and the ID information of the electronic device 101 to the server. Upon receiving the state information of the first peripheral device, the state information of the second peripheral device, and the ID information of the electronic device 101, the server may transmit the electronic device 101 a user interface for controlling the first peripheral device and a user interface for controlling the second peripheral device.

Upon receiving the user interfaces for controlling the first and second peripheral devices from the server, the electronic device 101 may display the first user interface for controlling the first peripheral device and the second user interface for controlling the second peripheral device. The first user interface and the second user interface may be presented as a single window or as separate windows. When the first user interface and the second user interface are presented as separate windows, the first user interface or the second user interface may be displayed on the screen through window switching. A UI element 1203 or 1207 may be displayed on the screen to indicate existence of a different window. The user may click the UI element 1203 or 1207 to switch between the windows. In a state where the first user interface 1201 is displayed, when the UI element 1203 receives user input, the first user interface 1201 is replaced with the second user interface 1205 on the screen through window switching. Similarly, in a state where the second user interface 1205 is displayed, when the UI element 1207 receives user input, the second user interface 1205 is replaced with the first user interface 1201 on the screen through window switching.

Figure 13:
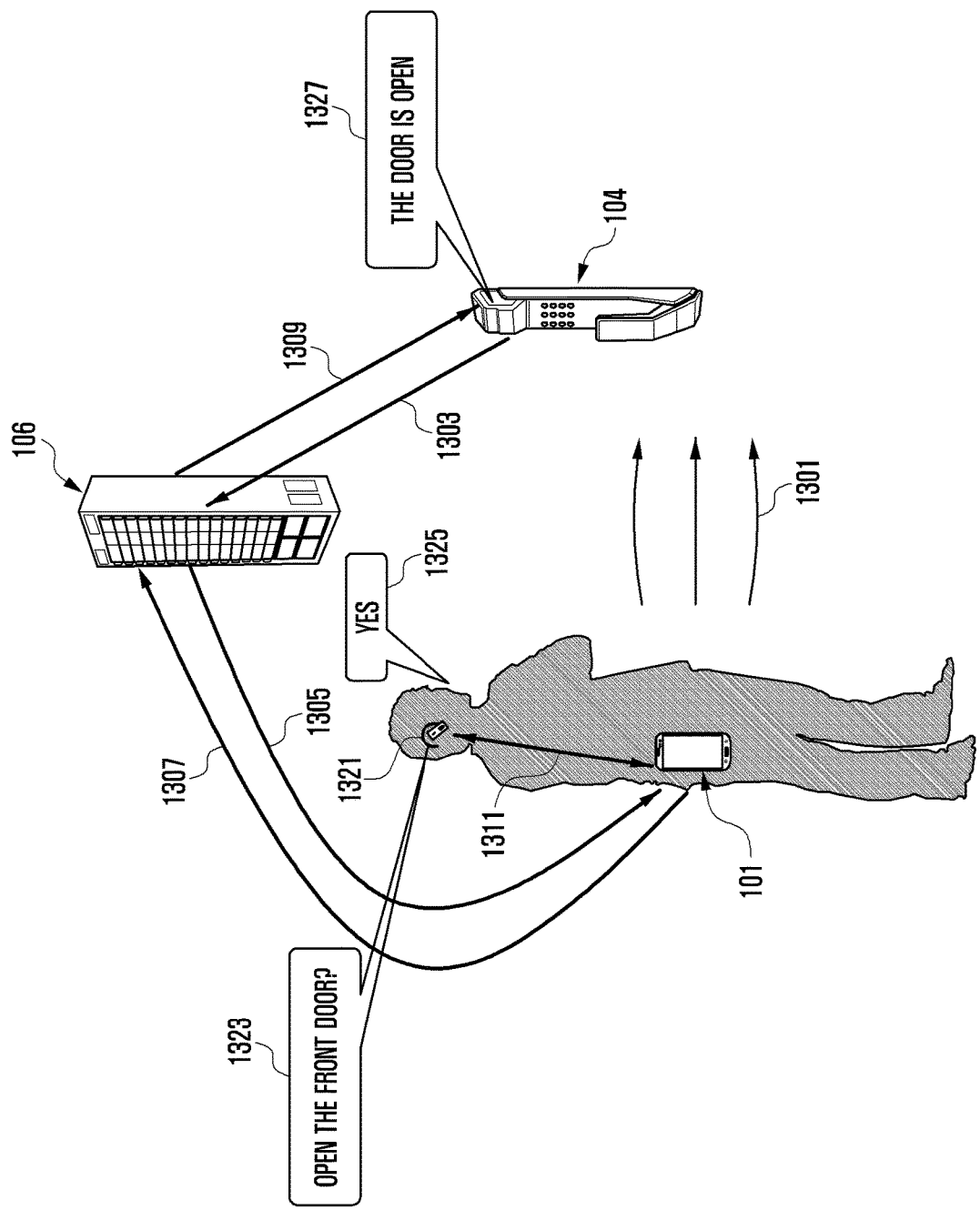
FIG. 13 illustrates a process whereby the electronic device controls another peripheral device according to another embodiment of the present invention.

FIG. 13 illustrates a process whereby the electronic device controls another peripheral device according to another embodiment of the present invention.

In FIG. 13, an electronic device 101, a Bluetooth enabled device 1321 (assumed to be a Bluetooth earphone 1321), a peripheral device 104, and a server 106 are shown. The peripheral device 104 may be a smart door lock. The electronic device 101 may be connected to the Bluetooth earphone 1321 through Bluetooth communication. The electronic device 101 may be connected to the smart door lock 104 through proximity communication such as BLE communication. The electronic device 101, the smart door lock 104, and the server 106 may be connected through long distance communication such as LTE.

That is, communication 1303, 1305, 1307 or 1309 is performed using the second communication scheme, which is long distance communication like LTE. Communication 1301 or 1311 is performed using the first communication scheme, which is short-range communication like Bluetooth.

When the user approaches the smart door lock 104, the smart door lock 104 may receive a packet 1301 advertised by the electronic device 101. The smart door lock 104 may extract the ID information of the electronic device 101 from the received packet, and transmit the ID information and the state information of the smart door lock 104 to the server 106 through the second communication scheme like LTE (1303). The server 106 may transmit a user interface for controlling the smart door lock 104 to the electronic device 101 on the basis of the ID information of the electronic device 101 and the state information of the smart door lock 104. For example, the server 106 may transmit a user interface for locking and unlocking the smart door lock 104 to the electronic device 101 (1305). Upon reception of the user interface from the server 106, the electronic device 101 may display the user interface for controlling the smart door lock 104 on the screen or may forward the same to the Bluetooth earphone 1321 (1311). In this case, the user interface 1311 may provide first information preset in relation to the operation of the smart door lock 104. For example, the Bluetooth earphone 1321 may provide a speech message "open the front door?" (1323) as the first information. As a response to the first information, the user may provide second information preset in relation to the operation of the smart door lock 104. For example, the user may answer "yes" (1325) as the second information, and the electronic device 101 may recognize the second information. The electronic device 101 may send data corresponding to the recognized speech (second information) to the server 106 (1307), and the server 106 may send an "open" command to the smart door lock 104 (1303). Upon reception of the command, the smart door lock 104 may unlock itself and provide third information (e.g. "the door is open" (1327)). The smart door lock 104 may provide the third information as a speech message.

Figure 14:
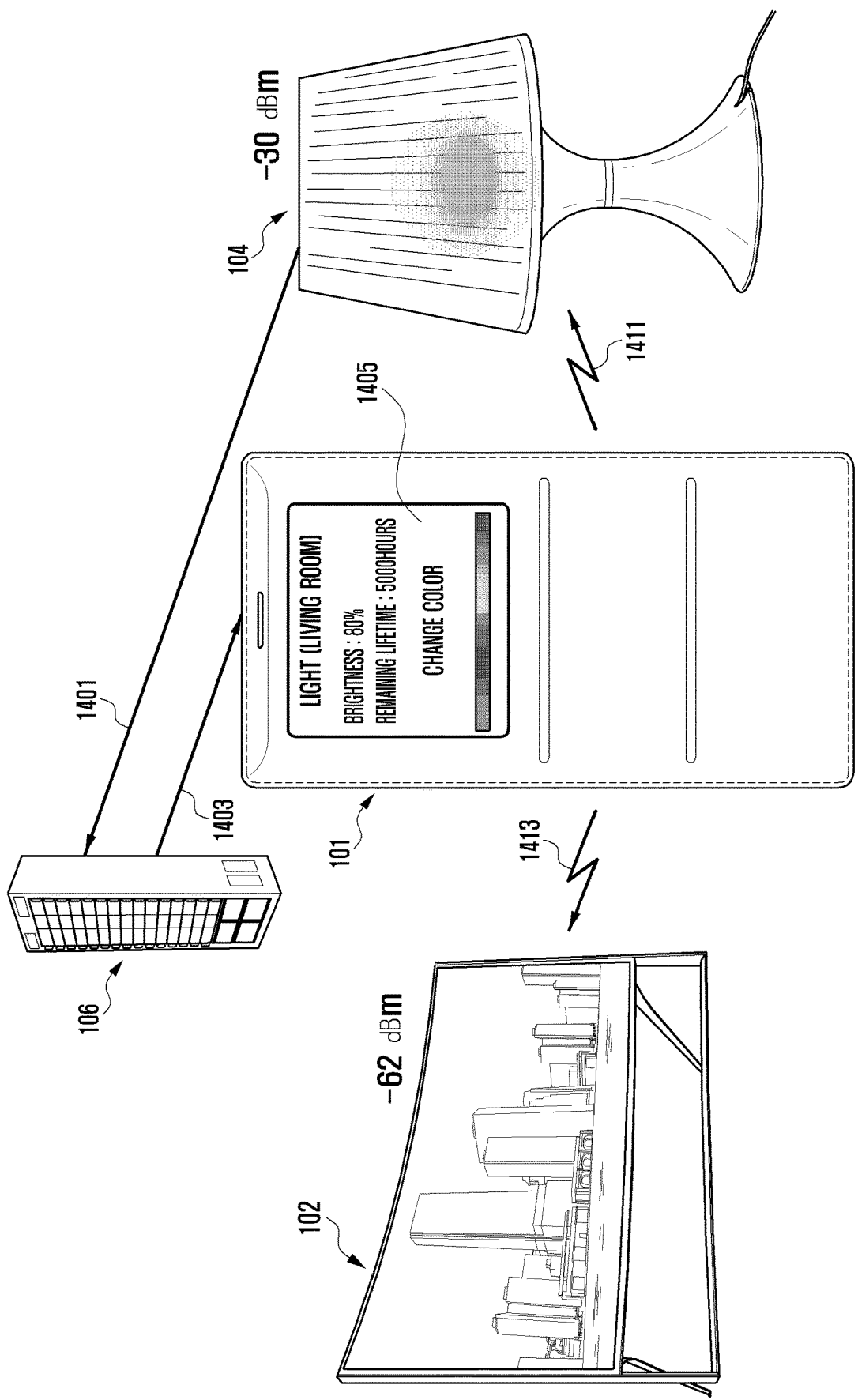
FIG. 14 illustrates a process whereby the electronic device is connected with multiple peripheral devices according to another embodiment of the present invention.

FIG. 14 illustrates a process whereby the electronic device is connected with multiple peripheral devices according to another embodiment of the present invention.

In FIG. 14, an electronic device 101, a TV 102, a smart light 104, and a server 106 are shown. The smart light 104 and the TV 102 are a peripheral device. When there are plural peripheral devices around the user, the user may not want to control all the peripheral devices. Hence, the server 106 may transmit the electronic device 101 a user interface for a peripheral device that is relatively close to the electronic device 101. The distance between the electronic device 101 and the peripheral device may be determined based on the received signal strength indicator (RSSI) of a signal that is advertised by the electronic device 101 and is measured by the peripheral device.

When the electronic device 101 advertises a packet, the peripheral device can measure the RSSI of the advertisement signal. When the RSSI of the advertisement signal is lower than or equal to a preset threshold, the peripheral device may ignore the received packet and may not transmit to the server 106. Alternatively, the peripheral device may send the RSSI measurement to the server 106. The server 106 may ignore data transmitted by a peripheral device whose RSSI measurement is lower than or equal to a preset threshold.

For example, when the electronic device 101 advertises (1413, 1411), the TV 102 and the smart light 104 may receive the advertisement signal and measure the received signal strength. When the signal strength of the signal received by the TV 102 is −62 dBm, the signal strength of the signal received by the smart light 104 is −30 dBm, and the threshold is −60 dBm, the TV 102 may not transmit the ID information of the electronic device 101 to the server 106 since the received signal strength is less than the threshold. The smart light 104 may transmit the ID information of the electronic device 101 to the server 106 since the received signal strength is greater than the threshold. Based on the ID information of the electronic device 101 and the state information of the smart light 104 received from the smart light 104, the server 106 may send the electronic device 101 a user interface 1405 for controlling the smart light 104 and current status information of the smart light 104 (1403).

Alternately, the TV 102 may send the server 106 the received signal strength, the state information of the TV 102, and the ID information of the electronic device 101. As the received signal strength of the TV 102 is less than the threshold, the server 106 may ignore the ID information of the electronic device 101 and the state information of the TV 102 received from the TV 102 without further processing.

The smart light 104 may send the server 106 the received signal strength, the state information of the smart light 104, and the ID information of the electronic device 101. As the received signal strength of the smart light 104 is greater than the threshold, the server 106 may send the electronic device 101 a user interface 1405 for controlling the smart light 104 and current status information of the smart light 104 (1403) on the basis of the ID information of the electronic device 101 and the state information received from the smart light 104.

Figure 15:
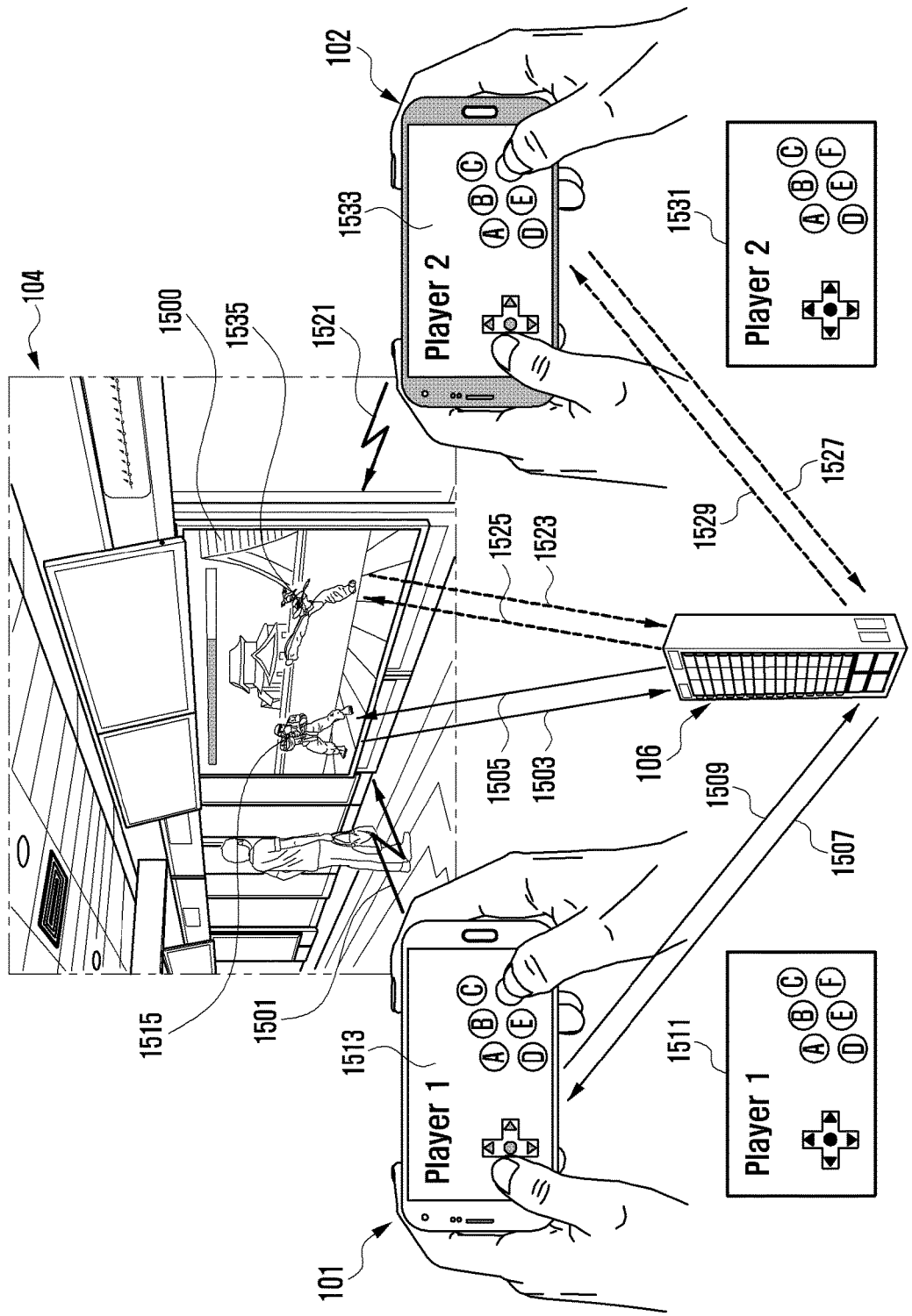
FIG. 15 illustrates a process whereby multiple electronic devices control a peripheral device according to another embodiment of the present invention.

FIG. 15 illustrates a process whereby multiple electronic devices control a peripheral device according to another embodiment of the present invention. That is, it is a scenario where two users play a game using an LFD for advertisement.

In FIG. 15, a first electronic device 101, a second electronic device 102, a peripheral device 104, and a server 106 are shown. The first electronic device 101 and the second electronic device 102 may be a smartphone. The peripheral device 104 may be a large flat display (LFD) for advertisement installed at a subway station.

Communication 1501 or 1521 is performed using the first communication scheme. The first communication scheme may be short-range communication. For example, the first communication may be BLE communication. Communication 1503, 1505, 1523, 1525, 1507, 1509, 1527 or 1529 is performed using the second communication scheme. The second communication scheme may be long distance communication. For example, the second communication may be LTE communication.

The first electronic device 101 is carried by a first user. The second electronic device 102 is carried by a second user.

The first electronic device 101 may advertise the ID information thereof to the LFD 104 (1501). The LFD 104 may send the ID information of the first electronic device 101 and state information of the LFD 104 to the server 106 (1503). The server 106 may send the first electronic device 101 a first user interface 1513 for controlling the first object 1515 displayed on the LFD 104 (1507). The server 106 may also transmit screen data to be displayed on the LFD 104. In a state where the first user interface 1513 is displayed on the first electronic device 101, when the first electronic device 101 receives user input, the first electronic device 101 may send data corresponding to the user input to the server 106. Then, the server 106 may send control data for the first object 1515 to the LFD 104 to thereby control the first object 1515.

For example, the server 106 may send the LFD 104 screen data 1500 to be displayed for the game, and may send the first electronic device 101 the first user interface 1513 for controlling movement of the first character 1515 used for the game. When the user touches the right key of the first electronic device 101, the first electronic device 101 sends data corresponding to the right key to the server 106. The server 106 sends the LFD 104 data for moving the first character 1515 to the right, and the first character 1515 displayed on the LFD 104 is moved to the right.

The second electronic device 102 may advertise the ID information thereof to the LFD 104 (1521). The LFD 104 may send the ID information of the second electronic device 102 and state information of the LFD 104 to the server 106 (1523). The server 106 may send the second electronic device 102 a second user interface 1533 for controlling a second object 1535 displayed on the LFD 104 (1529). In a state where the second user interface 1533 is displayed on the second electronic device 102, when the second electronic device 102 receives user input, the second electronic device 102 may send data corresponding to the user input to the server 106. Then, the server 106 may send control data for the second object 1535 to the LFD 104 to thereby control the second object 1535.

For example, the server 106 may send the second electronic device 102 the second user interface 1533 for controlling movement of the second character 1535 used for the game. When the user touches the left key of the second electronic device 102, the second electronic device 102 sends data corresponding to the left key to the server 106. The server 106 sends the LFD 104 data for moving the second character 1535 to the left, and the second character 1535 displayed on the LFD 104 is moved to the left.

Figure 16:
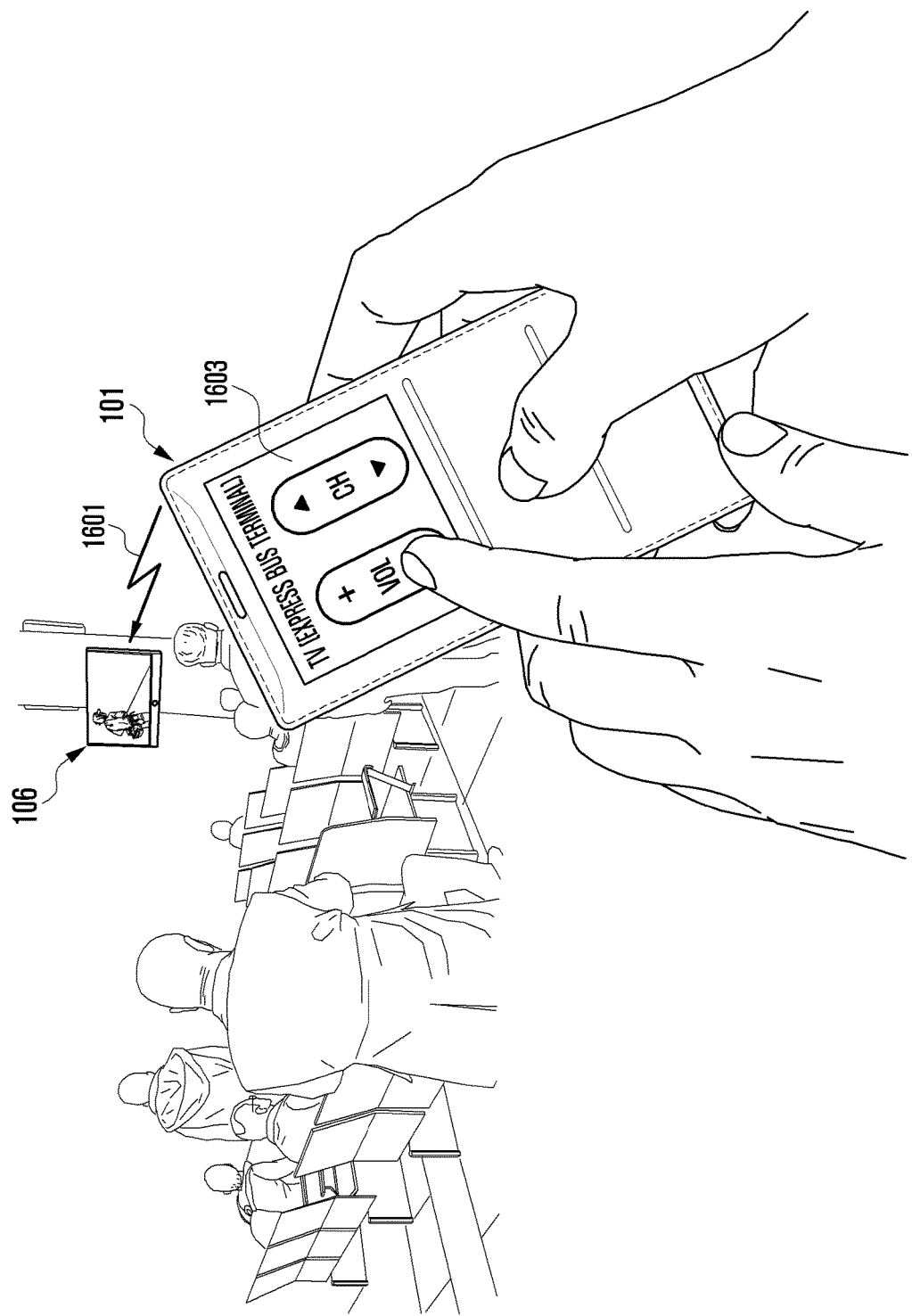
FIG. 16 illustrates a process whereby the electronic device controls another peripheral device according to another embodiment of the present invention.

FIG. 16 illustrates a process whereby the electronic device controls another peripheral device according to another embodiment of the present invention.

In FIG. 16, an electronic device 101 and a peripheral device 106 are shown. The electronic device 101 may be a smartphone. The peripheral device 106 may be a TV installed at a public place. For example, the peripheral device 106 may be a TV installed at the express bus terminal. The electronic device 101 may advertise the ID information thereof. When the electronic device 101 approaches the TV 106, the TV 106 may receive the advertised ID information of the electronic device 101 and send the received ID information and the state information of the TV 106 to the server. Based on the ID information of the electronic device 101 and state information of the TV 106, the server may send the electronic device 101 a user interface 1603 for controlling the TV 106. The electronic device 101 may display the user interface 1603 on the screen. In a state where the user interface 1603 is displayed on the screen, when the electronic device 101 receives user input on the screen, the electronic device 101 may send data corresponding to the user input to the server. Then, based on the received data, the server may send the TV 106 a command for controlling the corresponding function.

Figure 17:
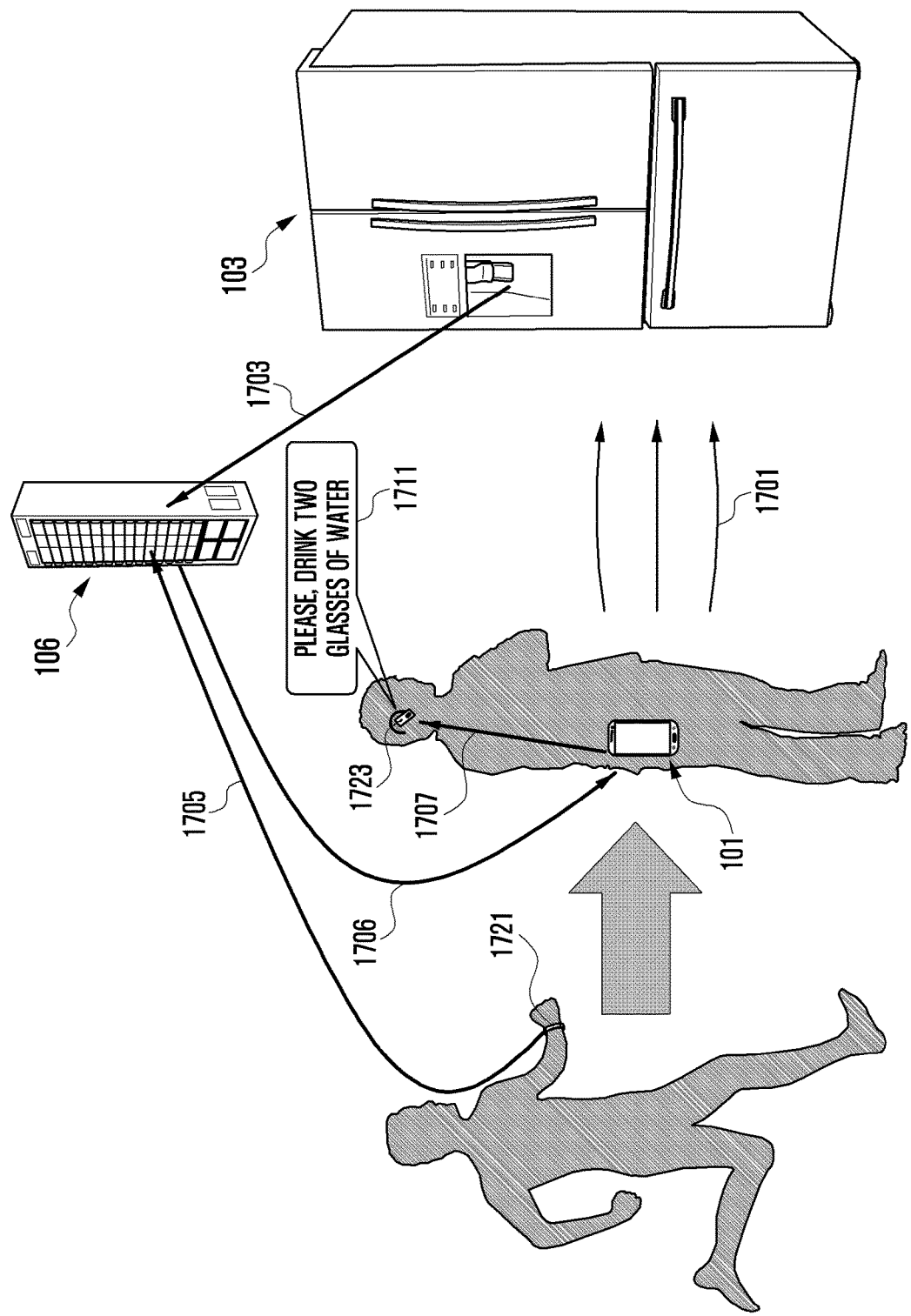
FIG. 17 illustrates a process whereby the electronic device controls another peripheral device according to another embodiment of the present invention.

FIG. 17 illustrates a process whereby the electronic device controls another peripheral device according to another embodiment of the present invention.

When the user is close to a home appliance in the home, different user interfaces may be provided to the electronic device of the user depending on the situation of the user. For example, when the user being identified as having just exercised approaches the front of the refrigerator, the server may provide a prompting message to recommend the user to consume water corresponding to the amount of exercise. If the user has a recent history of purchasing food ingredients, the server can provide the user with information about the cooking of the ingredients.

In FIG. 17, an electronic device 101, wearable devices 1721 and 1723, a peripheral device 103, and a server 106 are shown. The electronic device 101 may be a smartphone. The wearable device 1721 may be a smartwatch. The wearable device 1723 may be a Bluetooth earphone. The peripheral device 103 may be a refrigerator. Communication 1703, 1705 or 1706 may be performed using the second communication scheme, and communication 1707 or 1703 may be performed using the first communication scheme. The second communication scheme may be long distance communication, and the first communication scheme may be short-range communication. For example, the second communication scheme may be LTE communication, and the first communication scheme may be Bluetooth communication.

The smartwatch 1721 and the Bluetooth earphone 1723 are paired with the smartphone 101, and are connected through Bluetooth communication.

When the user exercises while wearing the smartwatch 1721, the exercise amount data and the information of the smartwatch 1721 may be transmitted to the server 106. Here, the information of the smartwatch 1721 may include the ID information of the electronic device 101.

After finishing the exercise, when the user approaches the refrigerator 103, the refrigerator 103 may receive the ID information of the electronic device 101 that has been advertised by the electronic device 101 (1701). The refrigerator 103 may send the ID information of the electronic device 101 to the server 106. Based on the ID information of the electronic device 101 received from the refrigerator 103 and the exercise amount data received from the smartwatch 1721, the server 106 may determine a message suitable for the user and send the determined message to the electronic device 101 (1706). The electronic device 101 may convert the received message into a sound signal and send the sound signal to the Bluetooth earphone 1723 (1707). The Bluetooth earphone 1723 may provide the user with a speech message 1711.

FIG. 18 illustrates a process whereby multiple electronic devices control a peripheral device according to another embodiment of the present invention. In FIG. 18, one peripheral device is controlled by a plurality of users, that is, plural electronic devices 1801, 1803 and 1805. For example, when there are a plurality of users in the vicinity of the LFD 1800 displaying advertisements, the server 1809 may transmit the electronic devices 1801, 1803 and 1805 of the users A, B and C a user interface for investigating the preference for the displayed advertisement. The users A, B and C may enter information about their preferences (e.g. votes) in the provided user interfaces, which may be then sent to the server 1809. Based on the input preference information, the server 1809 may change the contents of the advertisement displayed in the LFD 1800 or maintain the current advertisement. In addition, the server 1809 may pay a credit to the user having participated in the voting.

As another example, in a subway train with many passengers, when the passengers enter different desired temperatures, the server may receive the plural desired temperatures, compute the average of the desired temperatures, and perform a control operation so that the temperature inside the subway train maintains the computed average temperature.

In FIG. 18, multiple electronic devices 1801, 1803 and 1805, one peripheral device 1800, and one server 1809 are shown. The electronic devices 1801, 1803 and 1805 may be smartphones carried by different users A, B and C. The electronic device 1801 may be a smartphone of user A. The electronic device 1803 may be a smartphone of user B. The electronic device 1805 may be a smartphone of user C.

The peripheral device 1800 may be an LFD 1801 displaying an advertisement 1850. Here, the advertisement 1850 may be replaced with other content.

The server 1809 may include an account 1811 of user A, an account 1813 of user B, and an account 1815 of user C. Each account may store credit information for one user.

Communication 1821, 1822 or 1823 may be performed using the first communication scheme such as BLE communication. Communication 1824, 1825, 1826, 1827, 1828, 1829 or 1830 may be performed using the second communication scheme such as LTE communication.

The peripheral device 1800 may be an LFD 1801 displaying an advertisement 1850. Here, the advertisement 1850 may be replaced with other content.

Each of the multiple electronic devices 1801, 1803 and 1805 may advertise the ID information thereof (1821, 1822, 1823). When users A, B and C are close to the LFD 1800, the LFD 1800 may receive the ID information from each of the electronic devices 1801, 1803 and 1805.

When the first electronic device 1801 advertises first ID information (1821), the LFD 1800 may receive the first ID information and send the first ID information to the server 1809 (1828). Upon reception of the first ID information, the server 1809 may send the first electronic device 1801 a user interface for voting (1825). When user A votes in the first electronic device 1801, the first electronic device 1801 may send the voting result to the server 1809 (1824), and the server 1809 may update the credit information of the user A's account 1811.

When the second electronic device 1803 advertises second ID information (1822), the LFD 1800 may receive the second ID information and send the second ID information to the server 1809 (1828). Upon reception of the second ID information, the server 1809 may send the second electronic device 1803 a user interface for voting (1827). When user B votes in the second electronic device 1803, the second electronic device 1803 may send the voting result to the server 1809 (1826), and the server 1809 may update the credit information of the user B's account 1813.

When the third electronic device 1805 advertises third ID information (1823), the LFD 1800 may receive the third ID information and send the third ID information to the server 1809 (1828). Upon reception of the third ID information, the server 1809 may send the third electronic device 1805 a user interface for voting (1830). When user C votes in the third electronic device 1805, the third electronic device 1805 may send the voting result to the server 1809 (1829), and the server 1809 may update the credit information of the user C's account 1815.

The server 1809 may control the peripheral device 1800 based on data received from a plurality of electronic devices.

That is, on the basis of the voting result received from the first electronic device 1801, the voting result received from the second electronic device 1803, and the voting result received from the third electronic device 1805, the server 1809 may change the advertisement displayed on the LFD 1800 to another advertisement or other content. For example, the server 1809 may analyze the received voting results to determine the level of preference for the advertisement being displayed on the LFD 1800 (1841). The server 1809 may determine whether the voting result is adequate (1842). For example, the server 1809 may determine the adequacy or validity of the voting result based on the information on the voting time and/or the number of samples. If the preset voting time or the preset number of samples is not met, the server 1809 may determine that the voting result is inadequate or invalid. Based on the voting result analysis, the server 1809 may transmit control information for the content displayed on the LFD 1800 (1843). For example, based on the voting result analysis, the server 1809 may change the advertisement of the LFD 1800 by sending an advertisement change command to the LFD 1800. Based on the voting result analysis, the server 1809 may maintain the current advertisement of the LFD 1800 by sending an advertisement sustain command to the LFD 1800.

FIG. 19 illustrates a process whereby the electronic device controls multiple peripheral devices according to another embodiment of the present invention. The multiple peripheral devices may be elevators. That is, FIG. 19 shows an example of controlling elevators using a smartphone.

When a user approaches the elevator to board the elevator, a user interface for selecting the desired floor may be displayed on the smartphone of the user, and the user may select the desired floor and board the elevator. As another example, a building manager may utilize their terminal to control smart lights or air conditioners.

In FIG. 19, an electronic device 1901 and multiple peripheral devices 1905, 1907 and 1909 are shown. The electronic device 1901 may be a smartphone. Each of the peripheral devices 1905, 1907 and 1909 may be an elevator.

The electronic device 1901 may advertise the ID information thereof to the peripheral devices 1905, 1907 and 1909. Each of the peripheral devices 1905, 1907 and 1909 may send the received ID information of the electronic device 1901 to the server. Based on the state information received from each of the peripheral devices 1905, 1907 and 1909, the server may determine the peripheral device closest to the electronic device 1901 and transmit the electronic device 1901 a user interface for controlling the determined peripheral device.

For example, assume that elevator A (1905) is on the 20th floor, elevator B (1907) is on the 35th floor, and elevator C (1909) is on the 12th floor. When the user carrying the smartphone 1901 approaches the elevators on the first floor, each elevator may receive the ID information advertised by the smartphone 1901. Each elevator may transmit the ID information received from the smart phone 1901 and state information of the elevator (e.g. current position information) to the server. Based on the position information received from each elevator, the server may send the smartphone 1901 a user interface for controlling elevator C (1909), which is closest to the user. The user may select the desired floor through the user interface displayed on the smartphone 1901. When the user selects the desired floor, corresponding data is transmitted to the server, and the server may control elevator C (1909).

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. An electronic device comprising:
   a display;
   a communication unit; and
   a controller configured to:
      transmit ID information of the electronic device to at least one peripheral device,
      receive a user interface for controlling at least some of the at least one peripheral device from a server,
      output the received user interface, and
      transmit, to the server, control data for the at least some of the at least one peripheral device based on user input to the user interface.

2. The electronic device of claim 1, wherein the user interface is a graphic user interface.

3. The electronic device of claim 1, wherein the user interface is an audible user interface.

4. The electronic device of claim 1, wherein the user interface and the control data for the at least some of the at least one peripheral device include web-based information.

5. The electronic device of claim 1, wherein the controller is configured to transmit the ID information of the electronic device using broadcasting technology.

6. A system for controlling peripheral devices, comprising:
   an electronic device to transmit ID information;
   at least one peripheral device to receive the ID information; and
   a server that receives the received ID information of the electronic device and state information of the at least one peripheral device from the at least one peripheral device, and transmits, to the electronic device a user interface corresponding to the at least one peripheral device based on the ID information and the state information,
   wherein the electronic device receives user input while the user interface is being presented and transmits, to the server, data for controlling the at least one peripheral device in response to the user input, and the server controls the peripheral device based on the received data.

7. The system of claim 6, wherein the user interface and the data for controlling the at least one peripheral device include web-based information.

8. The system of claim 6, wherein the server is further configured to transmit the state information of the at least one peripheral device to the electronic device.

9. The system of claim 6, wherein the state information includes information on a received signal strength of a signal transmitted by the electronic device, and the server determines whether to control the peripheral device based on the received signal strength.

10. The system of claim 6, further comprising:
    the electronic device to transmit ID information using broadcasting technology.

11. The system of claim 6, further comprising:
    the server to perform determining the electronic device to have an authority of controlling the at least one peripheral device, and transmitting the user interface to the determined electronic device having the authority.

12. A method for an electronic device to control peripheral devices, the method comprising:
    transmitting ID information of the electronic device to at least one peripheral device;
    receiving a user interface for controlling at least some of the at least one peripheral device from a server;
    outputting the received user interface;
    receiving user input through the received user interface; and
    transmitting, to the server, control data for the at least some of the at least one peripheral device in response to user input.

13. The method of claim 12, wherein the user interface is provided in a visual form.

14. The method of claim 12, wherein the user interface is provided in an audible form.

15. The method of claim 12, further comprising:
    transmitting the ID information of the electronic device using broadcasting technology.

16. A method for controlling peripheral devices, comprising:
    transmitting, by an electronic device, ID information;
    receiving, by a peripheral device, the ID information;
    receiving, by a server, the ID information and state information of the peripheral device from the peripheral device;
    transmitting, by the server, a user interface corresponding to the peripheral device to the electronic device based on the ID information and state information;
    receiving, by the electronic device, the user interface;
    providing, by the electronic device, the received user interface;
    receiving, by the electronic device, user input through the received user interface;
    transmitting, to the server in response to the user input, data for controlling the peripheral device; and
    controlling, by the server, the peripheral device based on the received data.

17. The method of claim 16, further comprising:
    transmitting, by the electronic device, the ID information using broadcasting technology.

* * * * *